US006466310B2

(12) United States Patent
Nguyen et al.

(10) Patent No.: US 6,466,310 B2
(45) Date of Patent: *Oct. 15, 2002

(54) AUTOMATIC FIBER OPTIC CONNECTORIZATION AND INSPECTION SYSTEM (AFOCIS)

(75) Inventors: Sang Van Nguyen, Huntington Beach; Foad Towfig, Oceanside; John Andrew White, Orange, all of CA (US)

(73) Assignee: McDonnell Douglas Corporation, St. Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,499

(22) PCT Filed: Sep. 29, 1997

(86) PCT No.: PCT/US97/17451

§ 371 (c)(1),
(2), (4) Date: Aug. 20, 1998

(87) PCT Pub. No.: WO98/14810

PCT Pub. Date:Apr. 9, 1998

(65) Prior Publication Data

US 2002/0109831 A1 Aug. 15, 2002

Related U.S. Application Data

(60) Provisional application No. 60/025,778, filed on Sep. 30, 1996.

(51) Int. Cl.[7] .............................................. G01N 21/00
(52) U.S. Cl. .................................................... 356/73.1
(58) Field of Search ............................... 356/73.1, 237; 382/141, 108

(56) References Cited

U.S. PATENT DOCUMENTS

| 4,763,272 A | 8/1988 | McLandrich ................ 700/117 |
|---|---|---|
| 4,785,139 A | 11/1988 | Lynch et al. ................. 174/708 |
| 4,916,811 A | 4/1990 | Uehara et al. ................. 29/863 |
| 4,944,079 A | 7/1990 | Nakamura et al. ......... 29/33 M |
| 5,179,419 A * | 1/1993 | Palmquist et al. ......... 356/73.1 |
| 5,208,977 A | 5/1993 | Ricard .......................... 29/861 |
| 5,216,735 A | 6/1993 | Rondeau ....................... 385/78 |
| 5,253,412 A | 10/1993 | Fukuoka et al. ........... 29/566.3 |
| 5,258,613 A | 11/1993 | Okada et al. .......... 250/227.11 |
| 5,305,406 A | 4/1994 | Rondeau ....................... 385/81 |
| 5,386,490 A | 1/1995 | Pan et al. .................... 385/134 |
| 5,394,606 A | 3/1995 | Kinoshita et al. ............. 29/705 |
| 5,502,784 A | 3/1996 | Rondeau ....................... 385/66 |

FOREIGN PATENT DOCUMENTS

EP  0729047 A2  8/1996

OTHER PUBLICATIONS

International Search Report, PCT/US97/17451, filed Sep. 29,1997.

Eric A. Norland, *Defining And Measuring Physical Parameters Of PC Polished Connectors*, NFOEC94, Jun. 1994, pp. 259–265.

* cited by examiner

Primary Examiner—Frank G. Font
Assistant Examiner—Tu T. Nguyen
(74) Attorney, Agent, or Firm—Alston & Bird LLP

(57) ABSTRACT

A method and apparatus are provided for inspecting an end face of an optical fiber. The apparatus includes a memory device for storing images of acceptable end faces and unacceptable end faces, and an imaging system for obtaining an image of the end face of the optical fiber. Further, the apparatus includes a means, responsive to said imaging system, for comparing the image of the end fare of the optical fiber with the images of acceptable end faces and unacceptable end faces to automatically determine if the optical fiber is acceptable.

6 Claims, 24 Drawing Sheets

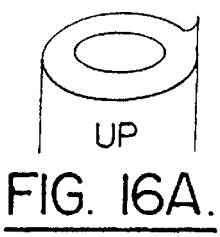
FIG. 16A. UP
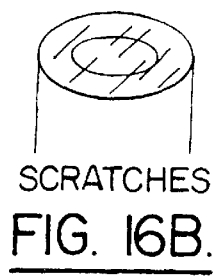
FIG. 16B. SCRATCHES
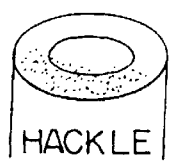
FIG. 16C. HACKLE
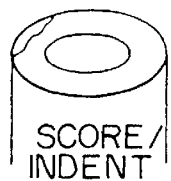
FIG. 17A. SCORE/INDENT
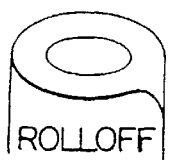
FIG. 17B. ROLLOFF
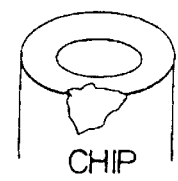
FIG. 17C. CHIP
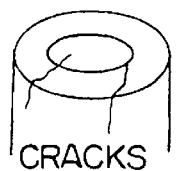
FIG. 17D. CRACKS
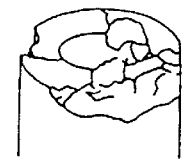
FIG. 17E. SHATTERED
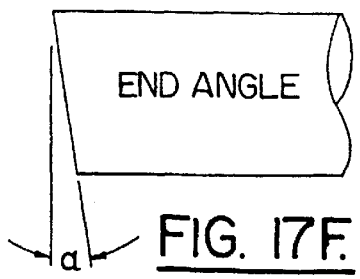
FIG. 17F. END ANGLE

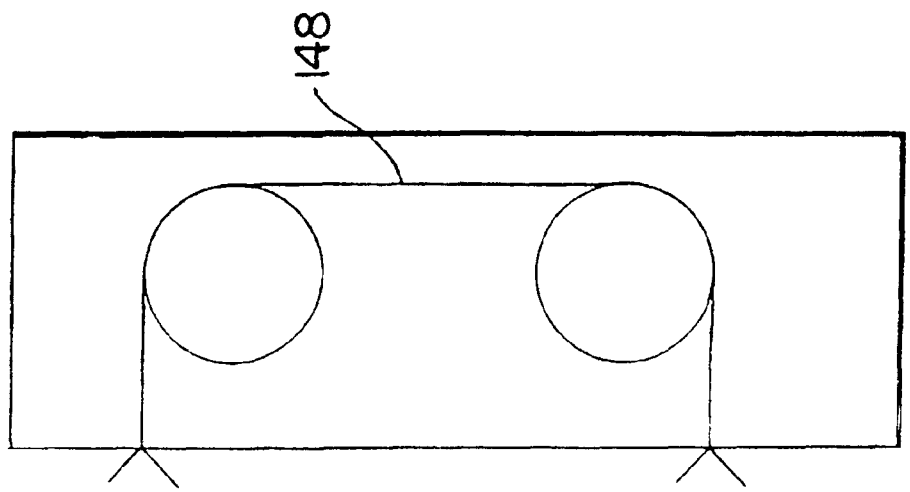
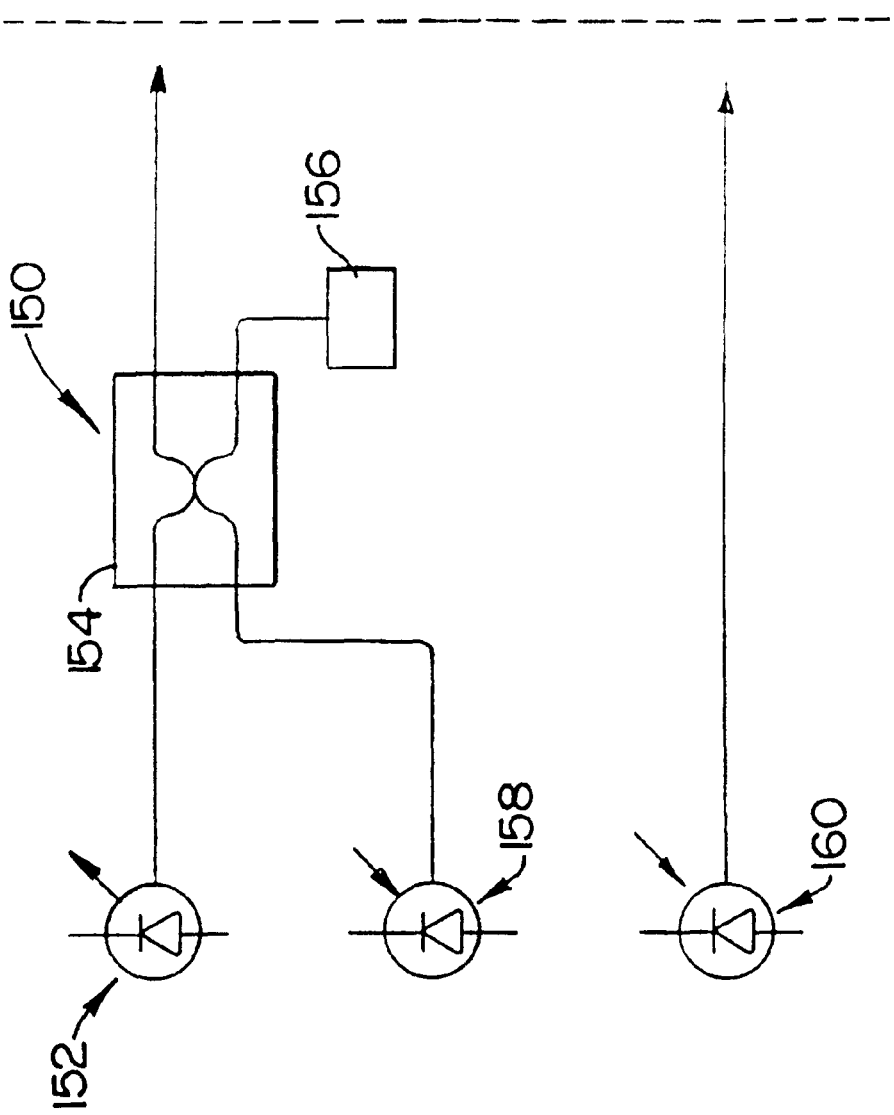
FIG. 19.

AUTOMATIC FIBER OPTIC CONNECTORIZATION AND INSPECTION SYSTEM (AFOCIS)

This application claims the benefit of provisional application 60/025,778 filed Sep. 30, 1996.

FIELD OF THE INVENTION

The present invention relates generally to a method and apparatus for connectorizing, testing and inspecting fiber optic cables and, more specifically, a method and apparatus for automatically connectorizing, testing and inspecting fiber optic cables.

BACKGROUND OF THE INVENTION

Fiber optic networks are employed in an increasing and varied number of applications for transmitting voice, data and other information. For example, fiber optic networks are utilized in a wide variety of aerospace applications for transmitting data at high speeds and with relatively low loss. Each of these fiber optic networks includes a number of optical fiber links. In turn, each optical fiber link generally includes a fiber optic connector mounted to the opposed ends thereof. This connectorization process is further complicated since each end face of the optical fiber must generally be precisely polished and cleaned after mounting the ferrule, but before mounting the remainder of the connector thereon. Thus, there is a risk of losing this expensive ferrule, if the polishing process is not successful. The industry's failure rate of polishing is approximately 10%, and the cost of each ferrule, such as ITT Cannon part number NFOC-F15PB, is $150. In addition, the connectorized optical fiber must oftentimes be inspected to insure compliance with performance specifications thereby further increase on labor costs. As a result, it typically takes approximately 20 minutes to manually connectorize one end of a fiber optic cable.

Current techniques for mounting connectors upon the end portions of fiber optic cables are generally quite complicated and labor intensive and may oftentimes require specially trained technicians and inspectors. As a result, the connectorization costs may quickly become unnecessarily large, particularly in view of the large number of fiber optic cables that must typically be connectorized by an aircraft manufacturer. In addition, current connectorization techniques often have poor repeatability, thereby producing fiber optic cables which have a wide variety of operating characteristics.

A number of automated techniques have therefore been developed for automatically mounting connectors upon the end portions of a fiber optic cable. For example, U.S. Pat. No. 5,394,606 to Isamu Knoshita, et al. and U.S. Pat. No. 4,944,079 to Kunio Nakamura, et, al. describe automated devices for connectorizing a fiber optic cable. Unfortunately, each of these automated techniques is limited to mounting one particular type of connector upon the end portion of a common fiber optic cable and is not designed to mount the wide variety of connectors upon the end portions of respective different fiber optic cables that are demanded by many modern applications, such as aerospace and local area network (LAN) applications.

SUMMARY OF THE INVENTION

It is therefore an object of the present invention to provide an improved method and apparatus for automatically connectorizing fiber optic cables.

It is another object of the present invention to provide a method and apparatus for automatically mounting any one of a variety of connectors upon the end portion of a fiber optic cable.

It is a further object of the present invention to provide an improved method and apparatus for automatically inspecting and classifying optical fibers during the connectorization process.

It is yet another object of the present invention to provide an improved method and apparatus for automatically testing the optical performance of a fiber optic cable after the connectorization process.

These and other objects are provided, according to one embodiment of the present invention, by a method and apparatus for mounting any one of a plurality of types of connectors upon the end portion of a fiber optic cable. According to this embodiment, the automated fiber optic connectorization apparatus includes a memory device for storing data relating to a plurality of types of connectors, such as the parts and supplies required to assemble each type of connector, and data relating to the fiber end-face geometry and corresponding optical performance data. The automated fiber optic connectorization apparatus also includes a controller for receiving input data that describe the detailed requirements for each fiber optic link, such as from a system operator, a wire data list, or other source, that specifies the type of connector to be mounted upon the end portion of the optical fiber. Based upon this input, the controller determines the components, i.e., the parts and supplies, required to mount the specified type of connector upon the end portion of the fiber optic cable based upon the data stored by the memory device. The automated fiber optic connectorization apparatus also includes means for obtaining the necessary components and means for assembling these components upon the end portion of the fiber optic cable. As a result, the automated fiber optic connectorization apparatus of this embodiment of the present invention can automatically mount the specified type of connector of the type upon the end portion of the fiber optic cable.

In addition to inputting the type of connector, the system operator, wire data list, or other source can also specify the length of the resulting fiber optic cable. Accordingly, the automated fiber optic connectorization apparatus of one embodiment includes a cutter for automatically cutting and stripping the cable components to varying lengths. Notably, the automated fiber optic connectorization apparatus can also include means for automatically polishing the end face of the optical fiber and inspecting the end face prior to mounting the connector upon the end portion of the optical fiber. Thus, the task of mounting the connector proceeds only if the polished surface of the fiber end-face has been inspected and is Pound to be acceptable.

To handle this task, a cassette is also provided for preparing the end face of an optical fiber, such as for polishing or cleaning the end face of an optical fiber. The cassette Includes a housing defining a window and a supply reel and a take up reel disposed within the housing. The cassette contains preparatory tapes, such as a polishing strip and a cleaning strip, that advances from the supply reel to the take up reel for preparing the end face of the optical fiber. Further, the cassette includes means for directing the tape by the window defined by the housing such that the tape contacts and prepares the end face of the optical fiber, such as by polishing or cleaning the end face of the optical fiber. For example, the directing means can include a resilient pad aligned with the window defined by the housing and disposed interior of the preparatory tape within the housing for supporting the preparatory tape during contact with the end face of the optical fiber. In order to properly prepare the end face of the optical fiber, the cassette also preferably includes means for controllably moving the housing relative to the end face of the optical fiber.

The automated fiber optic connectorization apparatus can also include means for automatically inspecting the optical fiber after the end face of the optical fiber has been polished. According to this embodiment, an automated optical fiber inspection apparatus is provided for automatically inspecting and classifying the polished end face of an optical fiber before proceeding to the next step, i.e. prior to connectorizing the fiber optic cable. According to this embodiment, the automated optical fiber inspection apparatus includes a memory device for storing predefined data sets relating to at least one characteristic of the end face of the optical fiber. For example, the data sets can be representative of images of acceptable end faces and unacceptable end faces.

The automated optical fiber inspection apparatus of this embodiment can also include an imaging system for obtaining an image, preferably a composite image generated from a series of captured images, characterizing the end-face contour of the optical fiber and means for comparing this composite image of the end face of the optical fiber against the predefined data sets relating to at least one characteristic of the end face of the optical fiber so as to automatically determine the "best-match" data set. Since each predefined data set has been classified as acceptable or unacceptable, the automated optical fiber inspection apparatus determines the acceptability of the end-face contour based upon the classification of the best-match data set. According to one advantageous embodiment, the automated optical fiber inspection apparatus can also include means for automatically determining if an unacceptable optical fiber can be corrected, such as by repolishing, or if the unacceptable optical fiber must be completed reworked, beginning by recleaving the end portion of the optical fiber. The automated optical fiber inspection apparatus can also include means, such as a test station, for testing the connectorized fiber optic cable to guarantee predefined optical operating parameters, such as optical loss or optical back-reflection.

During the process for automatically inspecting and connectorizing a fiber optic cable, the fiber optic cable is preferably carried by an optical fiber cartridge assembly which presents the appropriate segment of the fiber optic cable for jacket stripping, fiber cleaving, and end-face polishing operations. According to this embodiment, the optical fiber cartridge assembly includes an optical fiber cartridge including a platform, a reel rotatably mounted upon the platform, and first and second gripping means mounted upon the platform for holding the first and second opposed ends of the optical fiber, respectively. The optical fiber cartridge of this embodiment also includes means for rotating the platform relative to the reel such that the optical fiber is wound about the reel. In this regard, the optical fiber cartridge can include means for raising he reel relative to the platform during the rotation of the platform relative to the reel.

By providing for the automatic connectorization of fiber optic cables, the automatic fiber optic connectorization method and apparatus of the present invention significantly reduces the time and labor required to mount connectors upon the end portions of fiber optic cables, thereby increasing productivity. As a result, the automated fiber optic connectorization apparatus can be readily operated by technicians with very little training. The efficiency and yield of the automatic connectorization process of the present invention is further advanced by the automated optical fiber inspection apparatus of one embodiment that insures that the optical fibers have been properly polished prior to mounting of the expensive connectors and, if an optical fiber is unacceptable, automatically determines if the optical fiber must be repolished or otherwise reworked. In contrast to conventional automated connectorization techniques, the automated fiber optic connectorization apparatus of the present invention can advantageously mount any one of a plurality of types of connectors upon the end portion of a fiber optic cable based upon input by the system operator or other source, thereby permitting rapid customization of the automated fiber optic connectorization apparatus.

BRIEF DESCRIPTION OF THE DRAWINGS

FIGS. 16A–16C show the end faces of various optical fibers that may be corrected by further polishing.

FIGS. 17A–17F show the end faces of various optical fibers that cannot be corrected by further polishing.

FIG. 19 is a schematic view of the optical performance testing apparatus according to one advantageous embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scone of the invention to those skilled in the art. Like numbers refer to like elements throughout.

Figure 1:
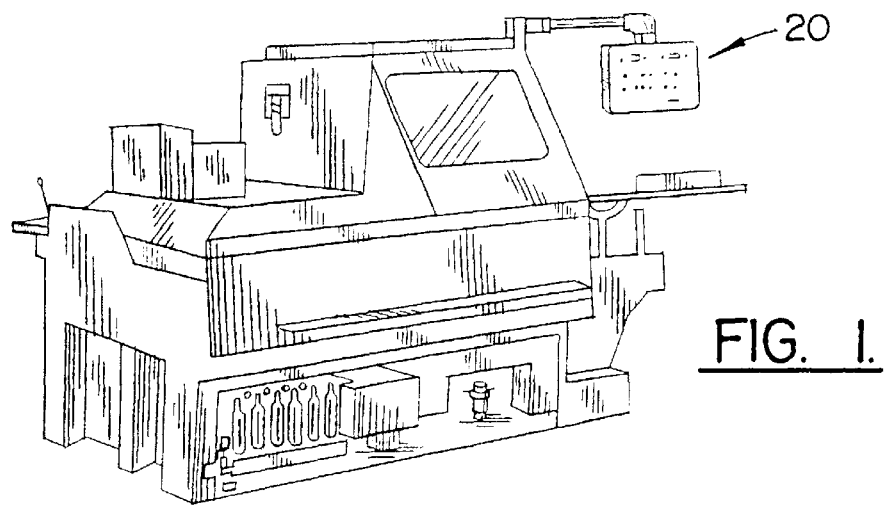
FIG. 1 is a perspective view of an automatic fiber optic connectorization apparatus of one embodiment of the present invention.

Referring now to FIG. 1, an automatic fiber optic connectorization apparatus 20 is illustrated. Although the automatic fiber optic connectorization apparatus is not unusually large, it is anticipated that the actual size of the automated fiber optic connectorization apparatus will be further reduced with further advances in miniaturization techniques. As explained below, the automatic fiber optic connectorization apparatus processes raw optical fiber based upon input provided by the system operator or other source, such as a computer network or another type of external computer, to produce a fiber optic cable that is cut to length and that has been connectorized with the appropriate connectors and inspected. Moreover, the automatic fiber optic connectorization apparatus tests the optical fiber during and following to connectorization process to insure compliance with performance specifications.

Figure 2:
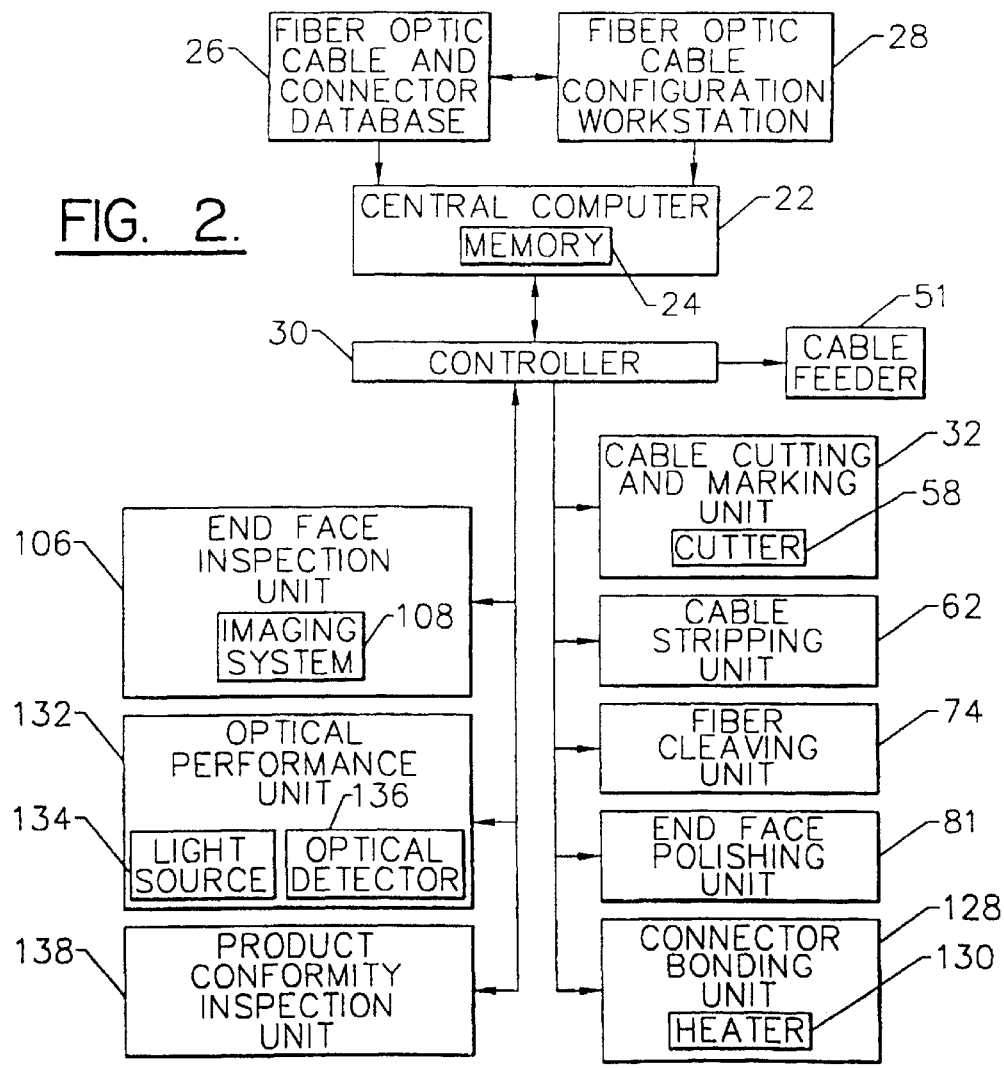
FIG. 2 is a block diagram of one advantageous embodiment of the automatic fiber optic connectorization apparatus of the present invention.

As shown in block diagram form in FIG. 2, the automatic fiber optic connectorization apparatus 20 preferably includes a central commuter 22 that operates under software control to perform the various functions shown in FIG. 2 and described hereinbelow. Although the automatic fiber optic connectorization apparatus can include many different types of central computers, the central computer of one advantageous embodiment is an Intel Pentium processor operating at 120 MHz or higher processing speeds. The central computer includes or is otherwise associated with a memory device 24 for storing a variety of data. In particular, the memory device stores data input by the system operator or other source as well as data downloaded from a fiber optic cable and connector database 26, i.e. a wire data list. As shown in FIG. 2, for example, the system operator enters data via a fiber optic cable configuration workstation 28. In turn, the fiber optic cable configuration workstation accesses the fiber optic cable and connector database and provides the computer with the appropriate data for constructing the cable specified by the system operator. Although he fiber optic cable and connector database is depicted to be external to the central computer, the fiber optic cable and connector database is preferably stored in memory within the central computer. In addition, although a fiber optic cable configuration workstation is provided for entry of data by the system operator, the necessary data can be downloaded or otherwise provided by another computer system without departing from the spirit and scope of the present invention.

Although a wide variety of data can be provided by the system operator or downloaded from a wire data list or other source, the data typically includes the length of the fiber optic cable, the connector type for each end of the fiber optic cable, the type of optical fiber and/or fiber optic cable, the finished fiber geometry requirements and the optical performance requirements, such as optical loss and optical back reflection. The finished fiber geometry requirements generally depend upon the type of polish, i.e., physical contact or convex method, flat polish or concave polish. With each type of polish, the data preferably provides the angular tolerance. However, the data also provides the depth of a concave polish, the height of a flat polish and the radius of curvature and height (apex) of an optical fiber having a convex end face.

In the illustrated embodiment, the central computer 22 passes data and control information to a programmable controller 30, such as an actuator controller or a micropositioner, which controls the various hardware components of the automatic fiber optic connectorization apparatus 20. Preferably, the controller has a flexible data input/output interface that can receive various data inputs, e.g., downloaded from a wire list, relating to a variety of fiber optic link characteristics including length, loss, back reflection, connector type, component parts, cable type, fiber size and internal adaptive component, i.e., the type of robotic connector adapter for holding and moving the connector during the various operations. Although the controller is depicted to be separate from the central computer, the central computer may include the controller without departing from the spirit and scope of the present invention. Once the central computer has received instructions from the system operator or other source, the central computer converts the raw data to precise control commands for each connectorization step such as marking cable cut length, end strip lengths, epoxy application, or fiber polishing, as described below. The controller feeds the raw fiber optic cable into a cable cutting and marking unit 32, either directly or by first winding the fiber optic cable onto an optical fiber cartridge 34 which is then moved Into an aligned position relative to the cable cutting and marking unit.

Figure 3A:
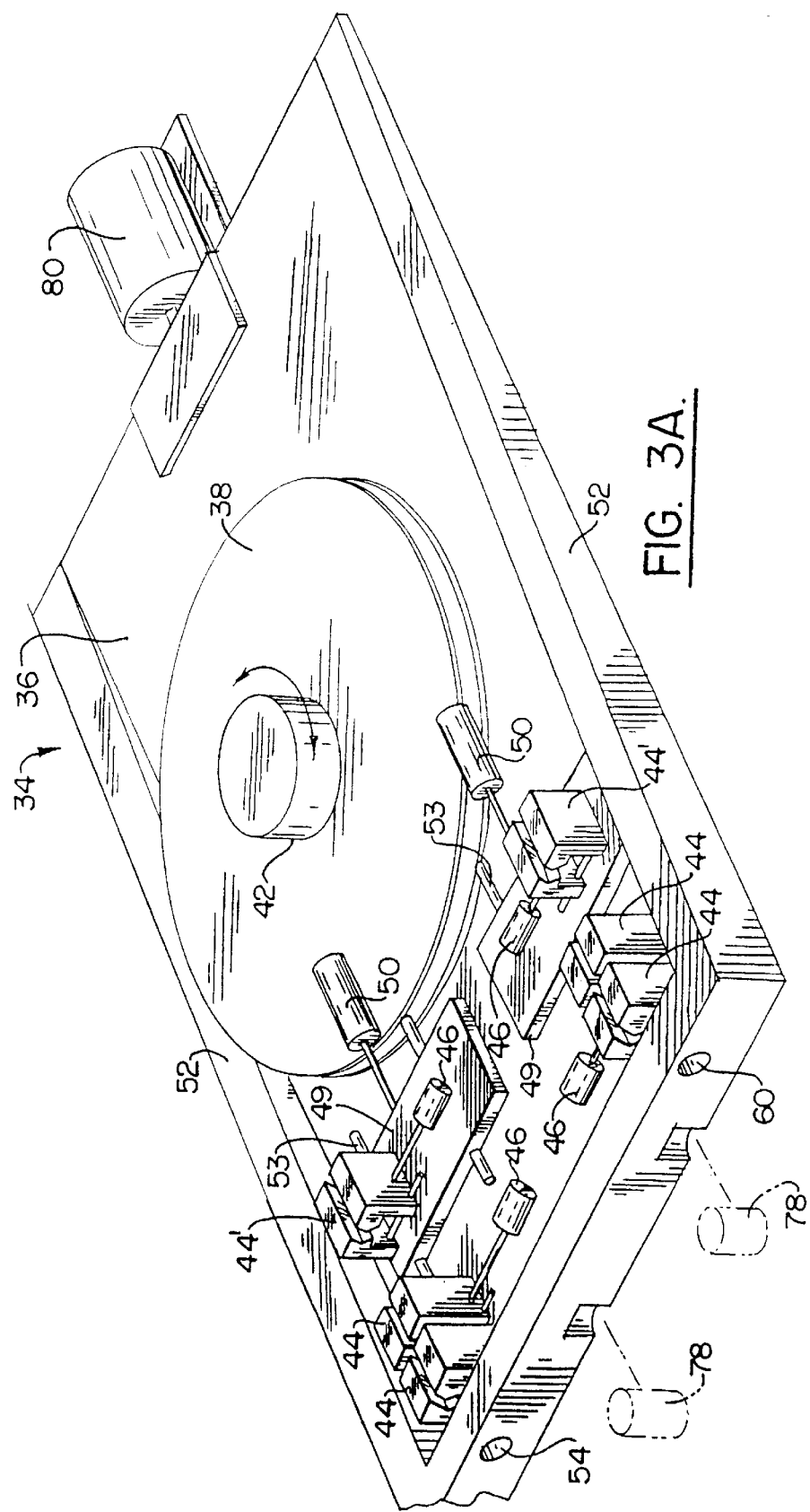
FIGS. 3A and 3B are perspective views of the optical fiber cartridge assembly of two advantageous embodiments of the present invention.

As shown in FIGS. 3A and 33, the optical fiber cartridge 34 includes a platform 36 and a reel 38 rotatably mounted upon the platform. The hub 42 of the reel must also be of sufficient diameter to prevent the fiber optic cable from bending more sharply than the predetermined bend radius of the fiber optic cable. For example, the hub of the reel of one advantageous embodiment has a diameter of at least 4 inches.

Figure 4A:
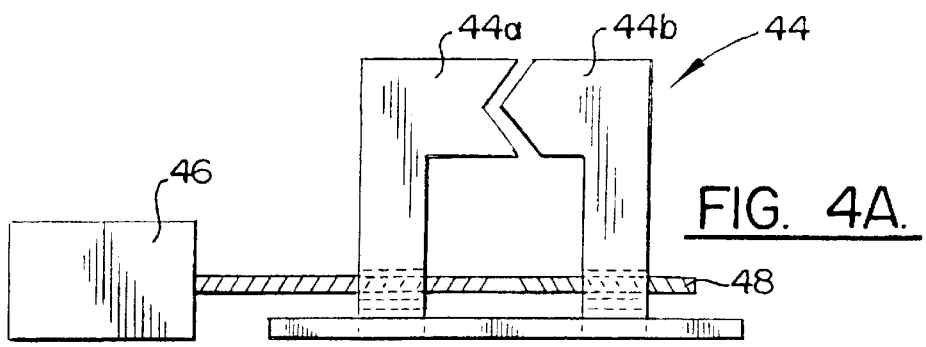
FIGS. 4A and 4B are end and plan views, respectively, of a gripper according to one embodiment of the present invention.
Figure 4B:
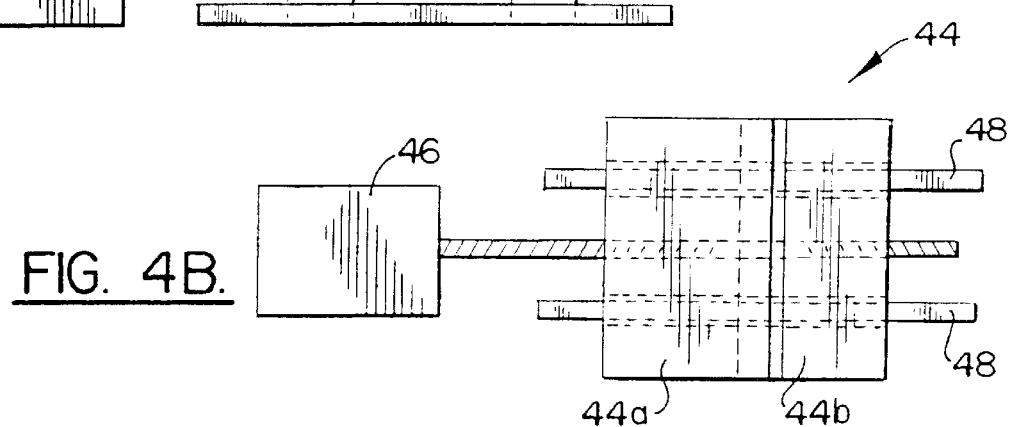

The optical fiber cartridge 34 also includes first and second gripping means mounted upon the platform 36 for holding the first and second opposed ends of the optical fiber, respectively. As shown in FIGS. 4A and 4B, each gripping means preferably includes a gripper 44 for receiving and securely holding the fiber optic cable and, more preferably, first, second and third grippers for holding the various stripped sections of the fiber optic cable, such as the bare optical fiber, the optical fiber surrounded by a buffer layer (inner jacket) and the cable jacket (outer jacket), respectively. Preferably, each gripper is designed to grip the entire range of dimensions for the respective cable component. For example, the third gripper 44' is preferably designed to hold the cable jacket of fiber optic cables having a diameter of 0.9 mm to 3.5 mm, while the first gripper is preferably designed to hold bare fibers ranging from 35 microns to 250 microns in diameter.

With reference to FIGS. 3 and 4, each gripper 44 of one advantageous embodiment preferably has a pair of opposed gripper arms 44a, 44b for engaging the respective cable component, such as the outer jacket of the fiber optic cable, the buffered optical fiber or the bare optical fiber. In order to securely engage the respective cable component, the first gripper arm can include a recessed or V-shaped section, while the second gripper arm can include a corresponding V-shaped protruding section. Each gripper can also include a respective actuator 46 for opening and closing the pair of opposed gripper arms. In order to further control the movement of the gripper arms, each gripper can include one or more rails 48 along which the gripper arms move. Although the grippers are shown to include actuators, the grippers can include a variety of other means for biasing the pair of opposed gripper arms into contact with the respective cable component. For example, the grippers can include one or more springs for biasing the protruding section of the second gripper arm into the recessed section of the first gripper arm so as to securely hold the respective cable component therebetween.

Figure 3B:
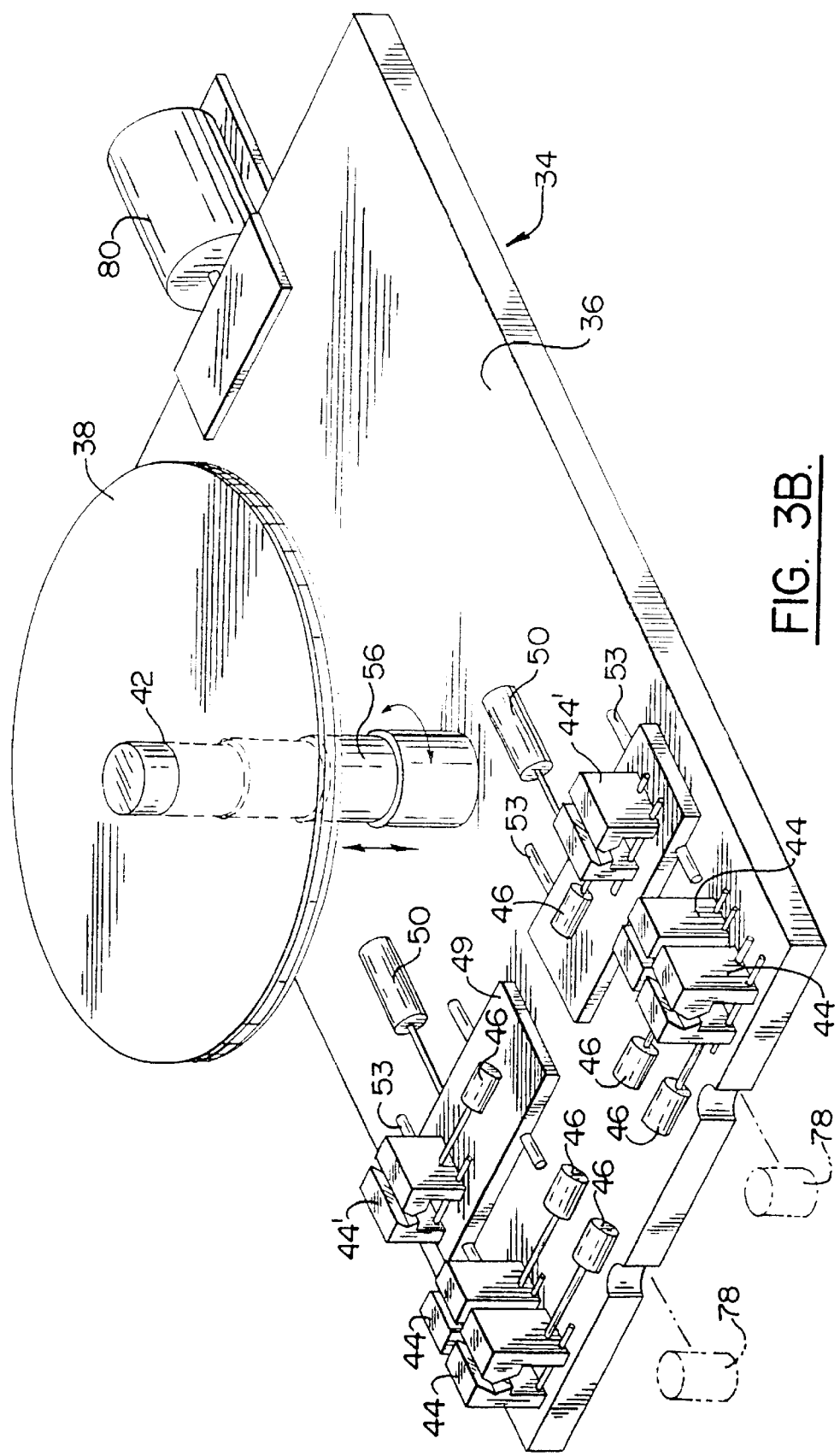

In one advantageous embodiment, the third gripper 44' designed to engage the cable jacket is mounted upon an adjustable platform 49 that is supported above the platform 36 of the optical fiber cartridge 34 by means of a second set of rails 53. As shown in FIGS. 3A and 3B, the third gripper also preferably includes a second actuator 50 for moving the adjustable platform relative to the platform of the optical fiber cartridge. By opening the first and second grippers designed to hold the bare optical fiber and the buffered optical fiber while concurrently engaging the cable jacket with the third gripper, the fiber optic cable can be moved relative to the platform of the optical fiber cartridge by advancing or retracting the second actuator. As such, the end portion of the fiber optic cable can be extending beyond the optical fiber cartridge, if so desired. The actuators associated with the first, second and third grippers are preferably controlled by the central controller 30 so as to precisely position the fiber with respect to the cable for a variety of cable and fiber diameter combinations.

Figures 5A, 5B:
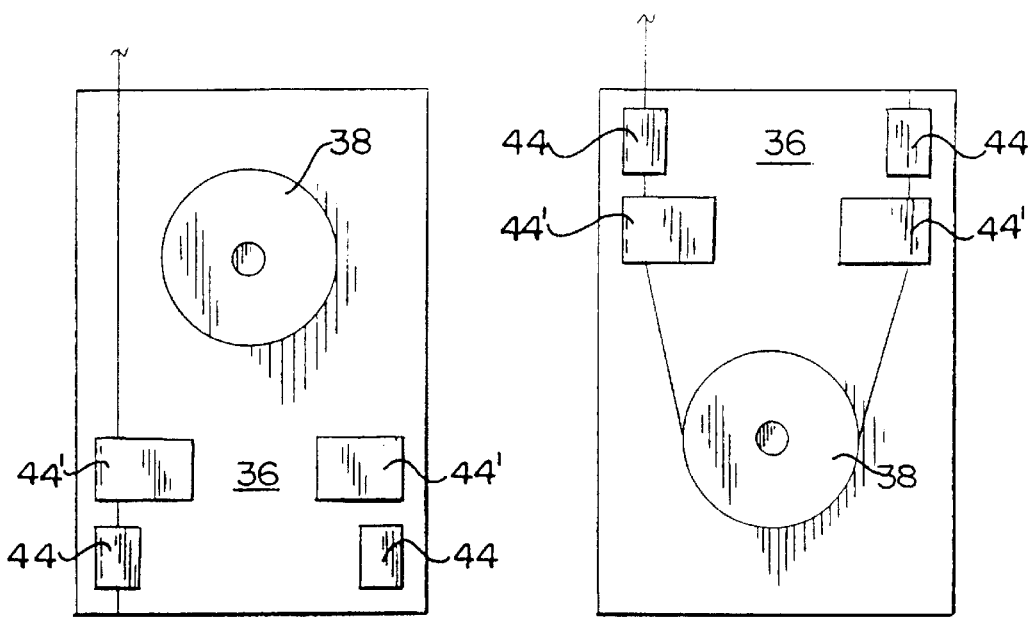
FIGS. 5A and 5B are plan views of an optical fiber cartridge according to one embodiment of the present invention that illustrates the winding of fiber optic cable upon the reel of the optical fiber cartridge.
Figure 6A:
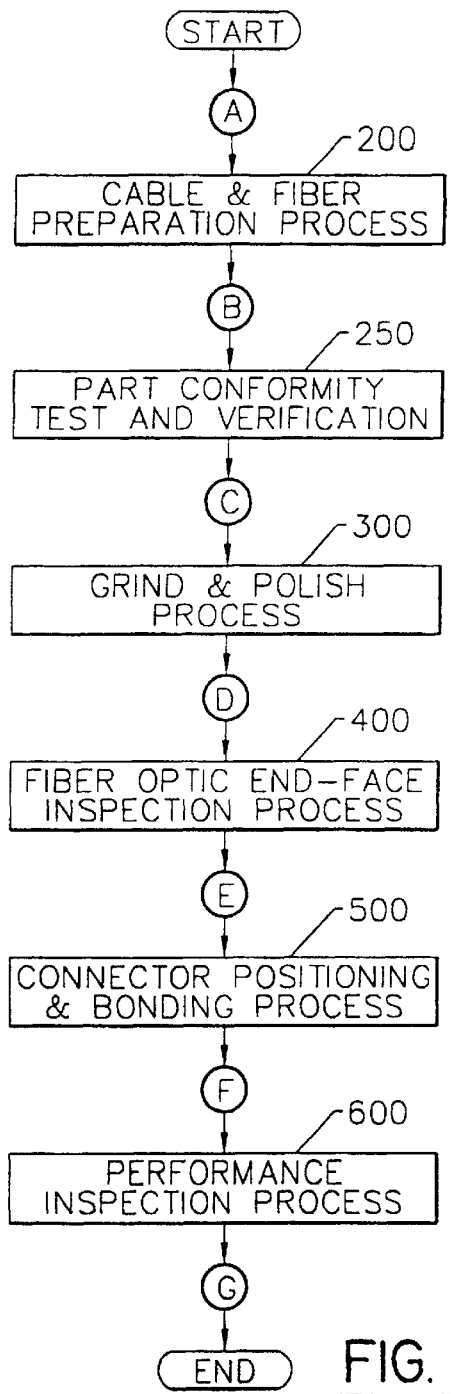
FIG. 6A is an overall block diagram of the operations performed by the automatic fiber optic connectorization apparatus of one embodiment of the present invention.

In order to begin the cable and fiber preparation process referenced by block 200 of FIG. 6A, fiber optic cable is first wound upon the optical fiber cartridge 34. Initially, the controller 30 actuates a cable feeder 51 to feed a firs end of the fiber optic cable from the rear of the cartridge through the first, second and third grippers 44 of the first gripping means as shown in FIG. 5A. In the embodiment of FIG. 3A in which the platform includes a sidewall 52, the first end of the fiber optic cable is also extended out through an opening 54 defined in the sidewall. The first, second and third grippers of the first gripping means then securely grip the first end of the fiber optic cable.

The optical fiber cartridge assembly 34 also includes means, such as an externally engaged rotating driver motor, for rotating the platform 36, in response to a command from the controller 30, so as to wind the predetermined length of fiber optic cable about the reel. As shown in the embodiment of FIG. 3A, the platform can include tapered sidewalls 52 that increase in height from the rear of the cartridge toward the front of the cartridge to guide the fiber optic cable over the grippers 44 while the fiber optic cable is being wound upon the reel. However, the platform need not include sidewalls. Instead, the optical fiber cartridge assembly can include means, such as an axle 56 having a telescoping shaft, for raising the reel relative to the platform as shown in FIG. 3B during the rotation to the platform such that the fiber optic cable passes over the grippers while being wound upon the reel. Once the predetermined length of fiber optic cable is wound upon the reel of this embodiment, the reel is lowered onto the platform and secured at a fixed position.

Typically, the controller 30 initiates rotation of the platform 36 which continues until the predetermined length of fiber optic cable is wound upon the reel. Thereafter, the rotating means, under control of the controller, halts rotation of the optical fiber cartridge with the optical fiber cartridge facing in the opposite direction so as to position the fiber optic cable over the first, second and third grippers 44 of the second gripping as shown in FIG. 5B.

The cable cutting and marking unit 32 of the automatic fiber optic connectorization apparatus 20 includes a cutter 58 responsive to commands from the controller. The cutter is designed to cut the cable near the forward edge of the optical fiber cartridge 34 once the predetermined length of fiber optic cable is wound upon the reel 38 to form a second end that extends loosely from the reel. The controller 30 then rotates the reel relative to the optical fiber cartridge to retract the second end of the fiber optic cable toward the rear of the optical fiber cartridge until the second end of the fiber optic cable is rearward of the third gripper 44' of the second gripping means. The controller then reverses the direction of rotation of the reel such that the second end of the fiber optic cable is pushed through the first, second and third grippers of the second gripping means so as to extend to the forward edge of the optical fiber cartridge. In the embodiment of FIG. 3A in which the platform includes a sidewall 52, the first end of the fiber optic cable is also extended out through another opening 60 defined in the sidewall. The first, second and third grippers of the second gripping means then engage the second end of the cable. The optical fiber cartridge loaded worth the predetermined length of fiber optic cable and having both end portions held by respective grippers may then be transported by robotic arm or other means throughout the various units of the automatic fiber optic connectorization apparatus for processing.

Figure 6B:
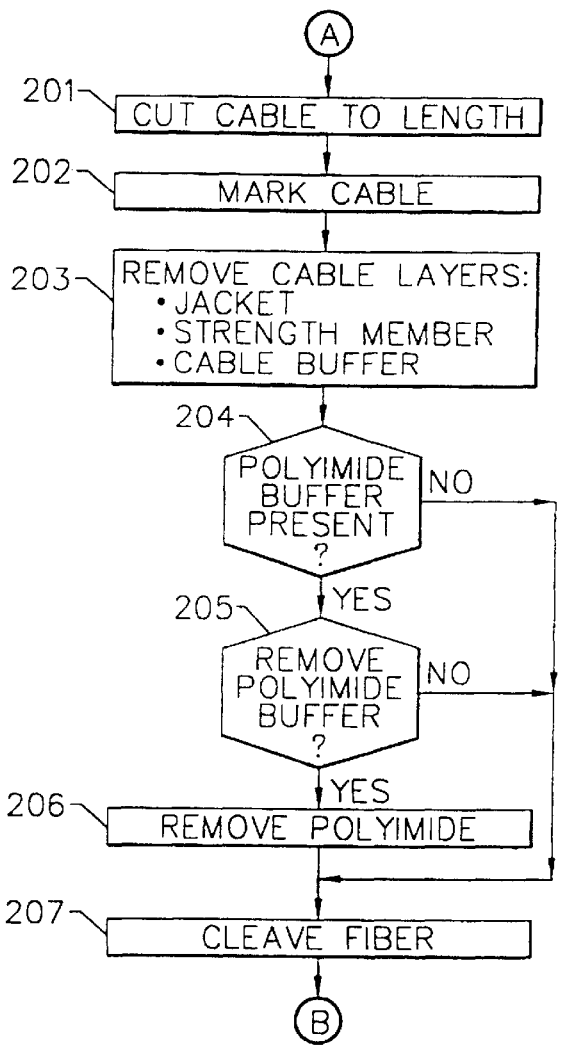
FIG. 6B is a block diagram of the operations performed to prepare a fiber optic cable according to one embodiment of the present invention.

Once the fiber optic cable has been wound upon the reel 38 and has been cut on the specified length as shown in block 201 of FIG. 6B, the cable cutting and marking unit 32 of the automatic fiber optic connectorization apparatus 20 marks the fiber optic cable. See block 202. For example, the cable cutting and marking unit can mark the fiber optic cable with a part number provided by the system operator or the fiber optic cable and connector database 26. In addition, the cable cutting and marking unit can affix. installation and/or termination information labels to one or both ends of the fiber optic cable to facilitate subsequent installation of the fiber optic cable.

The automatic fiber optic connectorization apparatus 20 also includes a cable stripping unit 62 for stripping the end portion of the fiber optic cable such that the strength members, the coating buffer and the optical fiber extend beyond the outer jacket by respective predetermined strip lengths. See also blocks 203–206 of FIG. 6B. As known to those skilled in the art, the predetermined strip lengths by which the strength members, the coating buffer and the optical fiber extend beyond the outer jacket are determined based upon the type of connector to be mounted upon the end portion of the fiber optic cable and the connectorization procedure. Typically, the central computer 22 accesses the fiber optic cable and connector database 26 to determine the diameter and correct strap length for each cable component once the type of fiber optic cable and the type of connector to be mounted upon the end portion of the fiber optic cable has been input. As such, the automatic fiber optic connectorization apparatus of the present invention allows a unique advancement by polishing the fiber to a critical length suitable for each connector type and then precisely securing the fiber within the connector ferrule for the desired combination of connector and fiber endface geometry.

Figure 7:
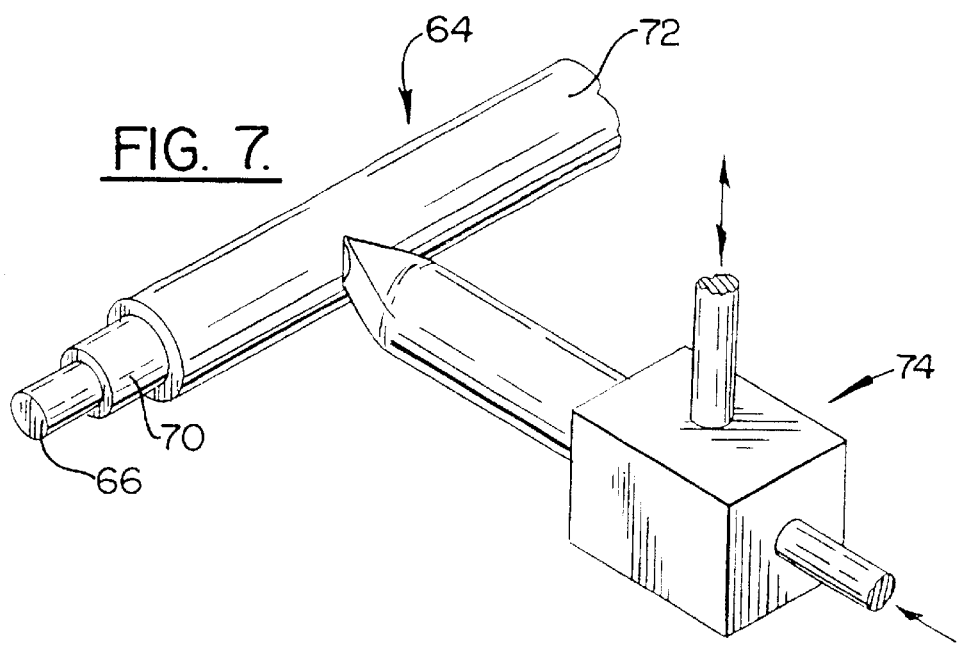
FIG. 7 is a perspective view of an end portion of a fiber optic cable in which the various layers have been partially removed or stripped for purposes of illustration.

The automatic fiber optic connectorization apparatus 20 is designed to mount a variety of types of connectors upon a variety of types of fiber optic cables. For mounting a connector upon a particular type of fiber optic cable, the central computer 22 must generally obtain the respective diameter of each cable component from the fiber optic cable and connector database 26 since different types of fiber optic cables have cable components with different diameters. Referring now to FIG. 7, for example, a single mode fiber optic cable 64 is illustrated which has an optical fiber 66 having a core that is approximately 6 microns in diameter and a cladding layer that is approximately 125 microns in diameter. As shown, the fiber core and cladding are oftentimes encased in a coating or polyamide buffer 70 having a diameter of approximately 174 microns that is, in turn, surrounded by a cable jacket 72, typically formed of a flouropolymer, polyvinylchloride (PVC) or polyurethane. It should be apparent that the foregoing dimensions are provided for purposes of example and not limitation since there are a number of other standard sizes of fiber optic cables, such as fiber optic cable having a core diameter of approximately 100 microns and a cladding diameter of 140 microns and fiber optic cables can include a core diameter of 400 microns and a cladding diameter of 480 microns. Although not shown, many fiber optic cables include strength members, typically formed of fiberglass or KEVLAR, that extend between the cable jacket and the buffer. in addition, although a fiber optic cable of tight tube construction is illustrated, the method and apparatus of the present invention could also be utilized in conjunction with fiber optic cables having a loose tube construction.

In order to strip the desired amount of each of the cable components from the end portion of the fiber optic cable, the fiber optic cable is positioned such that the end portion extends beyond the respective grippers 44. In this regard, the controller 30 commands the first and second gripping means to temporarily release the fiber optic cable and the reel 38 is rotated so as to extend one end portion of the fiber optic cable beyond the respective grippers by a preferred amount. The grippers then re-engage and hold the fiber optic cable in place during the stripping process. In order to strip the other end portion of the fiber optic cable, the grippers are again opened and the reel is rotated in the opposite direction such that the other end portion of the fiber optic cable extends beyond the respective grippers by a sufficient amount prior to again closing the grippers.

As shown in FIG. 2 and in more detail in FIG. 7, the automatic fiber optic connectorization apparatus 20 also includes a fiber cleaving unit 74, including a scribe, for cleaving the end portions of the fiber optic cable in order to provide a suitable end face. See block 206 of FIG. 6B. In order to properly cleave the end portion of the fiber optic cable such that the end face is perpendicular to the longitudinal axis of the fiber optic cable, the fiber optic cable must be precisely positioned relative to the scribe. Thus, the automatic fiber optic connectorization apparatus preferably includes a work table having one or more registration pins 78. In addition, the automatic fiber optic connectorization apparatus preferably includes one or more micropositioners that operate in response to commands by the controller 30 for precisely positioning the optical fiber cartridge 34 relative to the registration pins. As shown in FIGS. 3A and 3B, the automatic fiber optic connectorization apparatus can also include a solenoid 80 for maintaining the optical fiber cartridge in a fixed position against the registration pins on the work table once the optical fiber cartridge has been properly positioned by the micropositioner. Due to the design of the optical fiber cartridge, the grippers 44 maintain the fiber optic cable parallel to the surface of the work table, thereby permitting the cleaved end face to be perpendicular to the longitudinal axis of the fiber optic cable. In addition, the fiber cleaving unit preferably includes horizontal and vertical actuators for controllably positioning the scribe relative to the fiber optic cable.

Figure 6C:
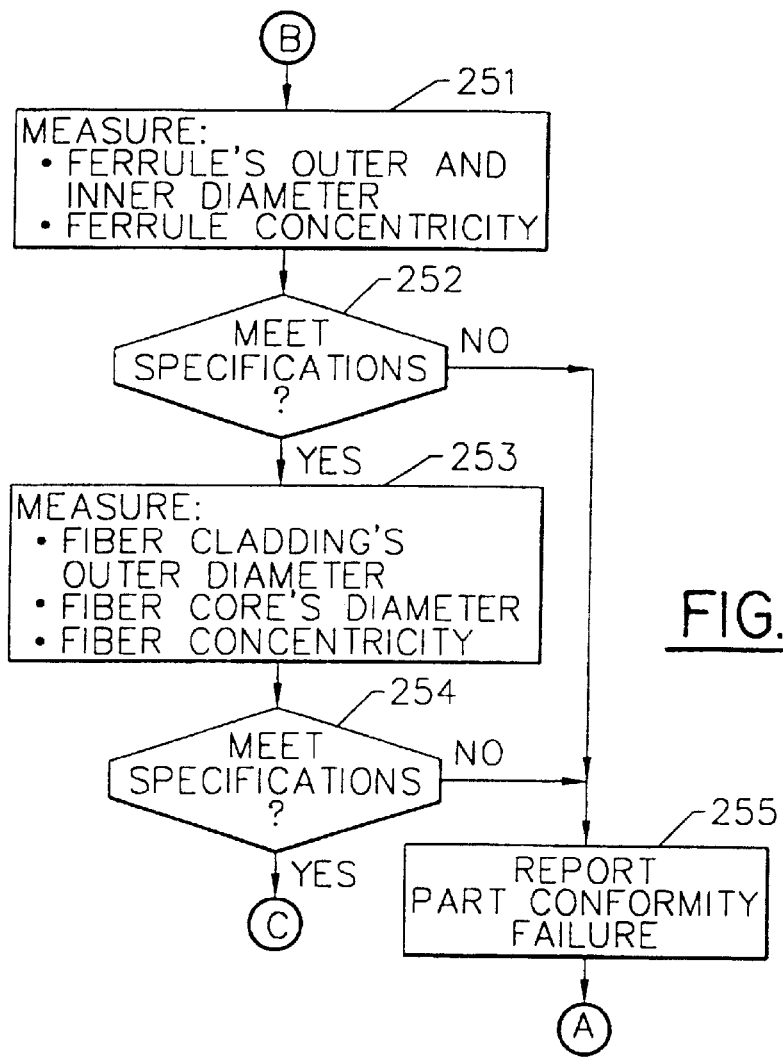
FIG. 6C is a block diagram of the operations performed to test and verify product conformity according to one embodiment of the present invention.
Figure 6D:
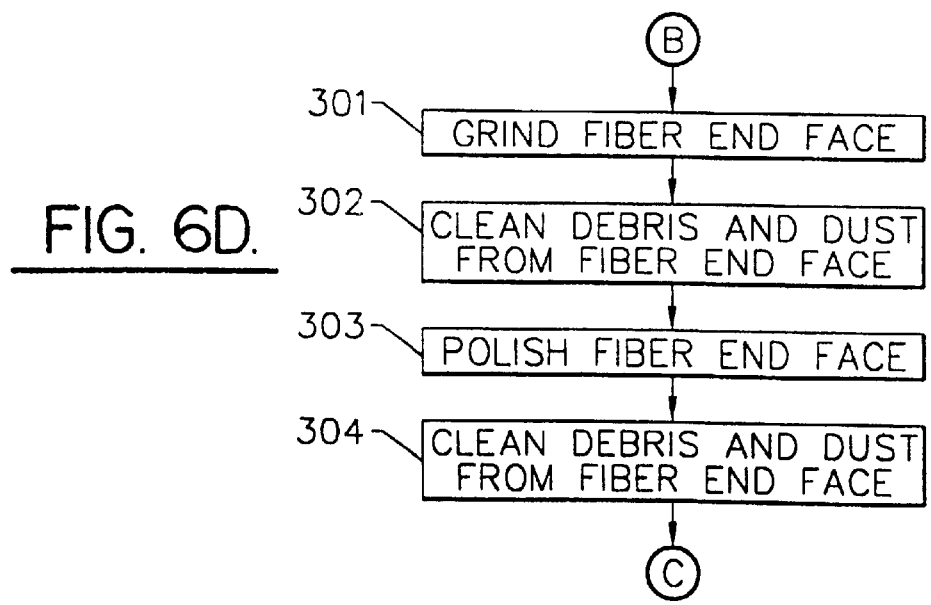
FIG. 6D is a block diagram of the operations performed to grind and polish the end face of an optical fiber according to one embodiment of the present invention.
Figure 8A:
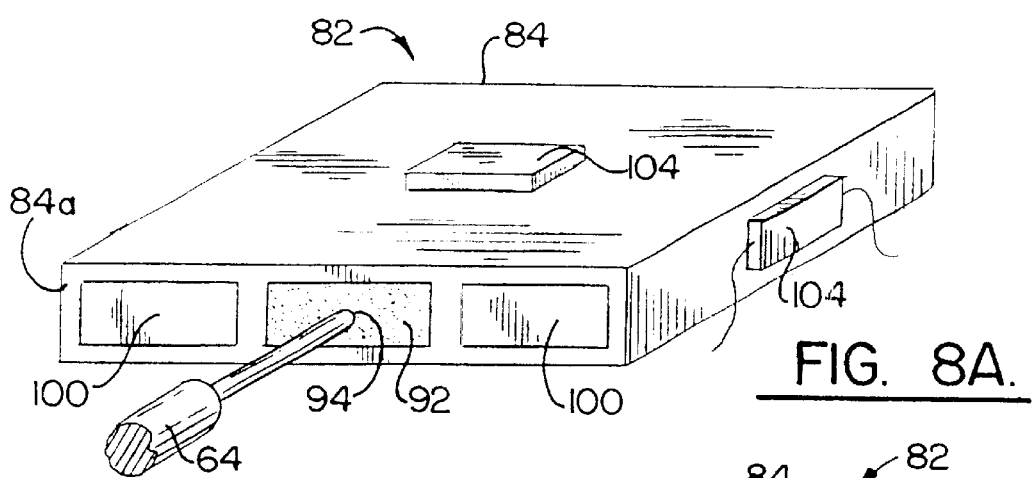
FIGS. 8A and 8E are perspective and fragmentary perspective views of a cassette for preparing the end face of an optical fiber according to one embodiment of the present invention.
Figure 8B:
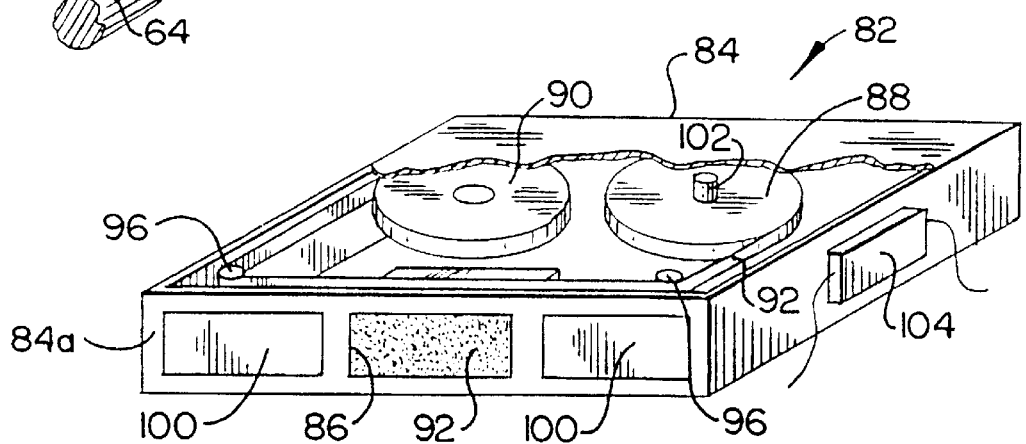

After cleaving each end face of the optical fiber of the fiber optic cable, the end faces are ground and polished to remove any defects and to provide the desired shape as shown generally in block 300 of FIG. 6A and in more detail in blocks 301–304 of FIG. 6D. According to one embodiment of the present invention, the automated fiber optic connectorization apparatus 20 includes an end face polishing unit 81 that includes a cassette 82 for preparing the end face of an optical fiber, such as by grinding, polishing or otherwise cleaning the end face of the optical fiber. As shown in FIGS. 8A and 8B, the cassette includes a housing 84 defining a window 86. The cassette also includes a supply reel 88 and a take up reel 90 disposed within the housing and a preparatory tape 92 extending between the supply reel and the take up reel. For example, the preparatory tape may be a polishing or lapping strip that includes an abrasive material. Typically, the preparatory tape also includes a cleaning strip that includes a cleaning solution.

The cassette 82 of this embodiment also includes means for directing the tare 92 by the window 86 defined by the housing 84 such that the tape will contact the end face 94 of the optical fiber 95. While the directing means can include any type of guides known to those skilled in the art, the directing means of one advantageous embodiment includes a pair of guides 96 positioned on opposite sides of the window for directing the preparatory tape in a direction parallel to the front surface 84a of the housing that defines the window. The directing means of one advantageous embodiment also includes a resilient pad 98, typically formed of a rubber or plastic material, that is aligned with the window and is disposed interior of the preparatory tape within he housing. As such, the resilient pad supports the preparatory tape by providing a backing surface during contact with the end face of the fiber optic cable. In order to protect the preparatory tape and maintain process control as the tape advances from the supply reel 88 to the take up reel 90, the cassette also preferably includes a pair of planar guides 100 inset within the front surface of the housing on either side of the window and formed of a material, such as a flouropolymer, having a relatively low coefficient of friction to avoid abrading the tape upon the inside surface of the cassette which could introduce contaminates to the tape and, in turn, to the end face of the fiber optic cable.

The cassette 82 also includes means for advancing the tape following use such that a fresh portion of the tape 92 is presented with the window for grinding, polishing, cleaning or otherwise preparing the end portion of the next optical fiber. While the tape could be advanced in a variety of manners, the supply reel and/or the take up reel of one embodiment of the cassette may include an axle 102 that extends outward beyond the housing 84. As such, the axle can be rotated following use of the tape to provide incremental advancement of the tape.

The end face polishing unit 81 also includes means for controllably moving the cassette 82 relative to the end face 94 of the optical fiber 95 in response to commands by the controller 30 to thereby polish the end face of the optical fiber. In one advantageous embodiment shown in FIG. 8A, the end face polishing unit includes one and, more preferably, a pair of actuators 104, such as piezoelectric actuators, mounted on respective sides of the cassette. In order to provide movement of the cassette parallel to the end face of the optical fiber in two mutually perpendicular directions, the pair of actuators should be placed adjacent sides of the cassette that are also perpendicular in response to predetermined signal patterns provided to he actuators by the controller, the actuators will move the cassette and, more particularly, the tape 92 in a circular, figure eight or other pastern as required by the type of optical fiber being polished and the type of connector to be mounted upon the optical fiber. Typically, information defining the predetermined signal patterns that will be provided by the controller to drive the actuators can also be provided by the fiber optic cable and connector database 26.

In addition, the cassette 82 could be positioned, typically by means of micropositioners that respond to commands from the controller 30, to change its direction of contact with the end face 94 of the optical fiber. For example, a cassette that is otherwise oriented such that the tape is in a direction perpendicular to the Longitudinal axis of the optical fiber can be tilted either upwards or downwards and/or to the right or to the left to present a different angle of attack, thereby permitting further control in shaping the resulting end face of the optical fiber.

As described below, the same or a similar cassette 82 to that shown in FIGS. 8A and 8B and described above may be used for applying cleaning solution and for removing dirt and debris as well as excess adhesive or epoxy from the end face 94 of the optical fiber 95. In this embodiment, the preparatory tape 92 can include cleaning pads that are provided in the form of an elongated strip that advances between the supply and take up reels.

As shown in FIG. 1, the automatic fiber optic connectorization apparatus 20 defines an enclosed space within which the optical fiber is cleaved, ground and polished. The cleaving, grinding and polishing of an optical fiber creates dust and debris which may be classified as hazardous waste. As such, the automatic fiber optic connectorization apparatus preferably includes a positive pressurization and ventilation system, i.e., a vacuum system, for capturing and removing the fiber dust and debris as set forth in blocks 302 and 304 of FIG. 6D.

Typically, the automatic fiber optic connectorization apparatus 20 performs multiple cleaning and polishing steps. For example, the end face of the optical fiber is typically ground, and is then cleaned to remove dust, dirt and grinding compounds and is finally subjected to one or more polishing steps in which the end face of the optical fiber is polished with increasingly finer abrasives in each successive polishing step. The multiple cleaning and polishing steps can be provided by repeatably changing the preparatory tape 92 within the cassette 82 or by moving the optical fiber from station to station, each of which includes a different cassette for grinding, cleaning or polishing the end face of the optical fiber.

After grinding and polishing the end face of the optical fiber, the end face is inspected as shown in block 400 of FIG. 6A. If the end face is not acceptable, the end face is repolished or otherwise reworked, is possible, prior to being re-inspected. If the end face cannot be satisfactorily repolished or otherwise reworked, the fiber optic cable will be rejected. Once rejected, the fiber optic cable may be re-cleaved and completely reprocessed. Alternatively, the rejected fiber optic cable may be discarded.

Figure 6E:
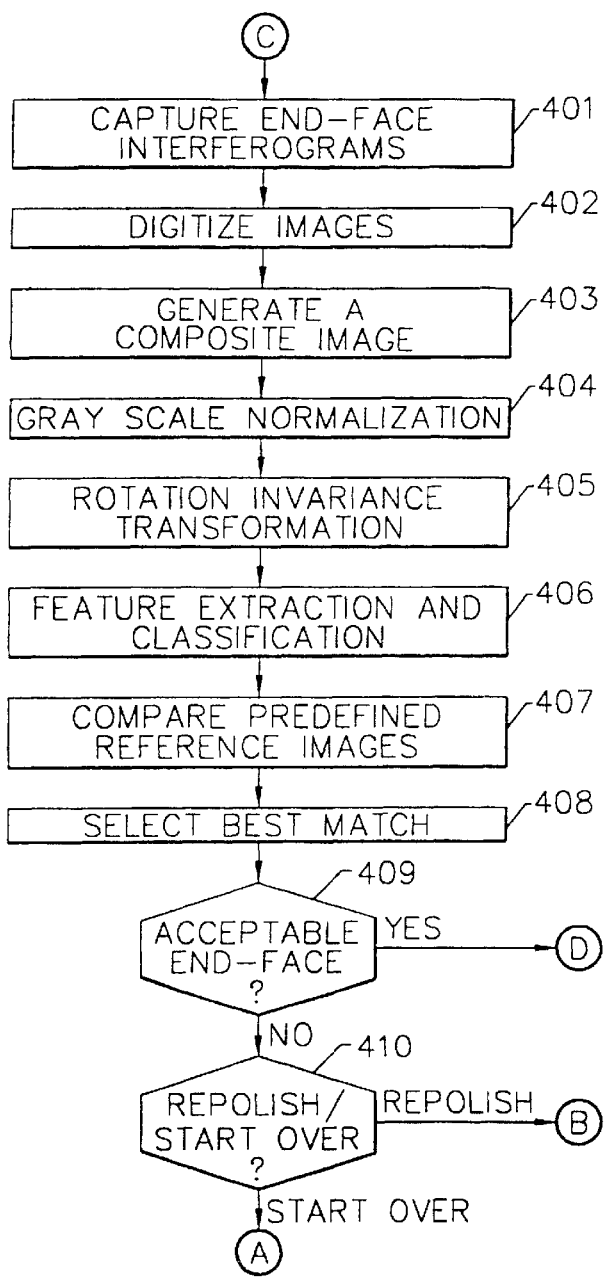
FIG. 6E is a block diagram of the operations performed to inspect the end face of an optical fiber according to one embodiment of the present invention.

As shown in FIG. 2, the automatic fiber optic connectorization apparatus 20 includes an end face inspection unit 106 (also referred to as an automated optical fiber inspection apparatus) for capturing interferrograms of the end face of the optical fiber that will be utilized to characterize the geometry of the end face. See block 401 of FIG. 6E. As described below, typical interferrograms of an end face of an optical fiber are shown in FIGS. 9A–9D.

The end face inspection unit 106 includes or is associated with an imaging system 108 for obtaining an image of the end face of the optical fiber. Preferably, the imaging system obtains and digitizes interferrograms of the end face of the optical fiber and then stores the digitized interferrograms in a memory device. See block 402.

Figure 14:
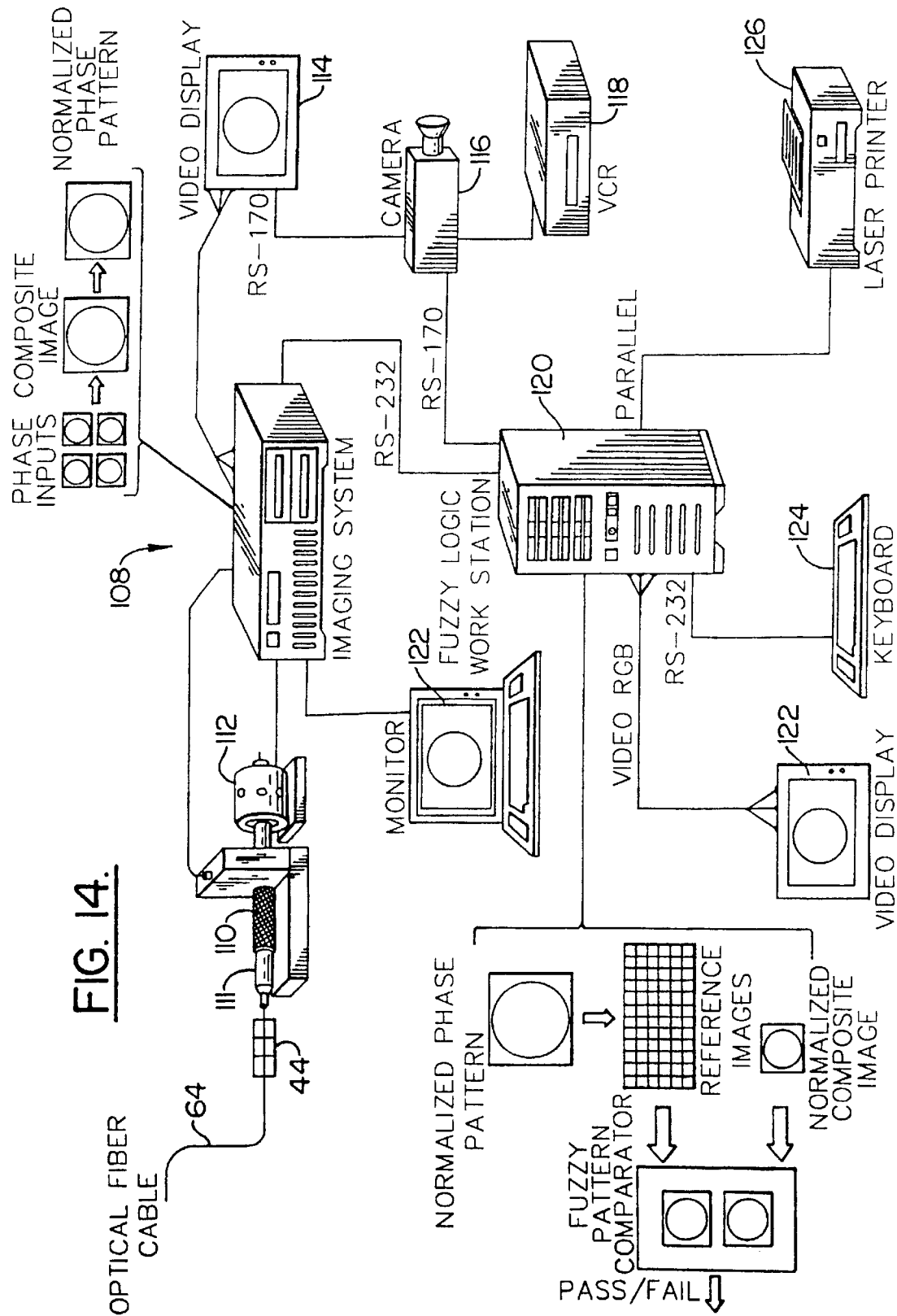
FIG. 14 is a schematic diagram of the automated optical fiber inspection apparatus of one embodiment of the present invention.

According to one advantageous embodiment shown in FIG. 14, the imaging system 108 includes a scanning camera 110, an interferometer 111 and an associated micropositioner 112 for moving the camera in increments, such as 6 micron increments, in order to scan the surface of the end face 94 of the optical fiber 95 at different phase shift positions per exposure, such as $\pi/2$ phase shift positions per exposure. Thus, the imaging system of this embodiment can generate interferrograms at each of a number of different phase shifts, such as a hundred or more different phase shifts. For example, FIGS. 9A–9D depict the interferrograms generated at four different phase shifts, namely, $\pi/2$, $\pi$, $3\pi/2$ and $2\pi$. For example, one embodiment of the imaging system which scans at 6 micron increments and can take up to 700 images at a time is commercially available and is designated as a Physic Instrument (PI) from Nordland Products, Inc. However, the imaging system can include other frame grabber software, if so desired.

The intensity measurements for the pixel located at (x,y) in each of the four interferrograms ($I_1$, $I_2$, $I_3$ and $I_4$) obtained by the imaging system are:

$I_1(x,y)$, $I_2(x,y)$ $I_3(x,y)$, $I_4(x, y)$

Figure 9A:
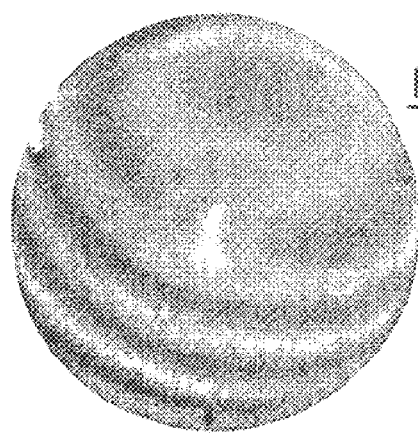
FIGS. 9A–9D depict four phase shift images (or interferrograms) with phase shifts of $\pi/2$, $\pi$, $3\pi/2$ and $2\pi$, respectively.
Figure 9B:
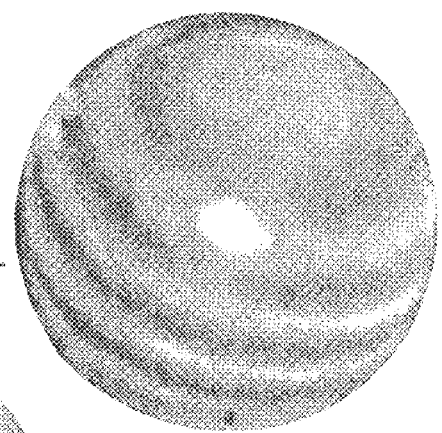
Figure 9C:
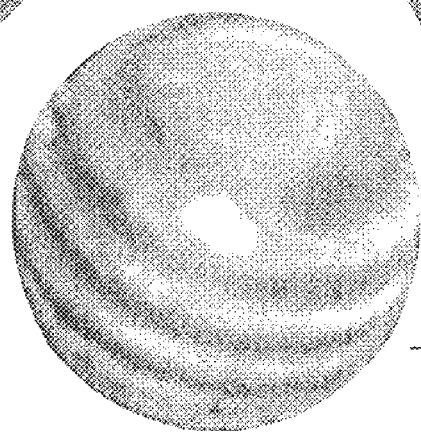
Figure 9D:
Figure 9E:
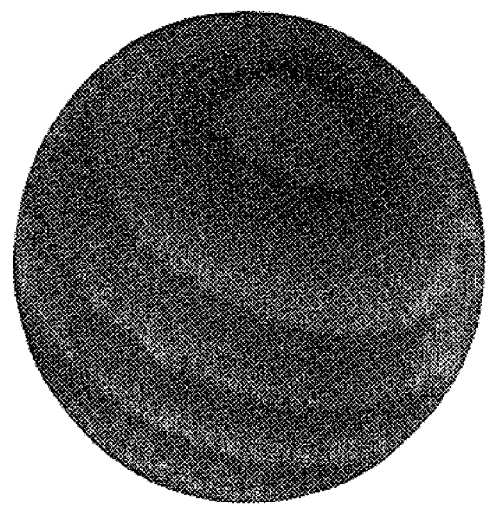
FIG. 9E is a composite phase shift image based upon the four phase shift images of FIGS. 9A–9D.
Figure 10:
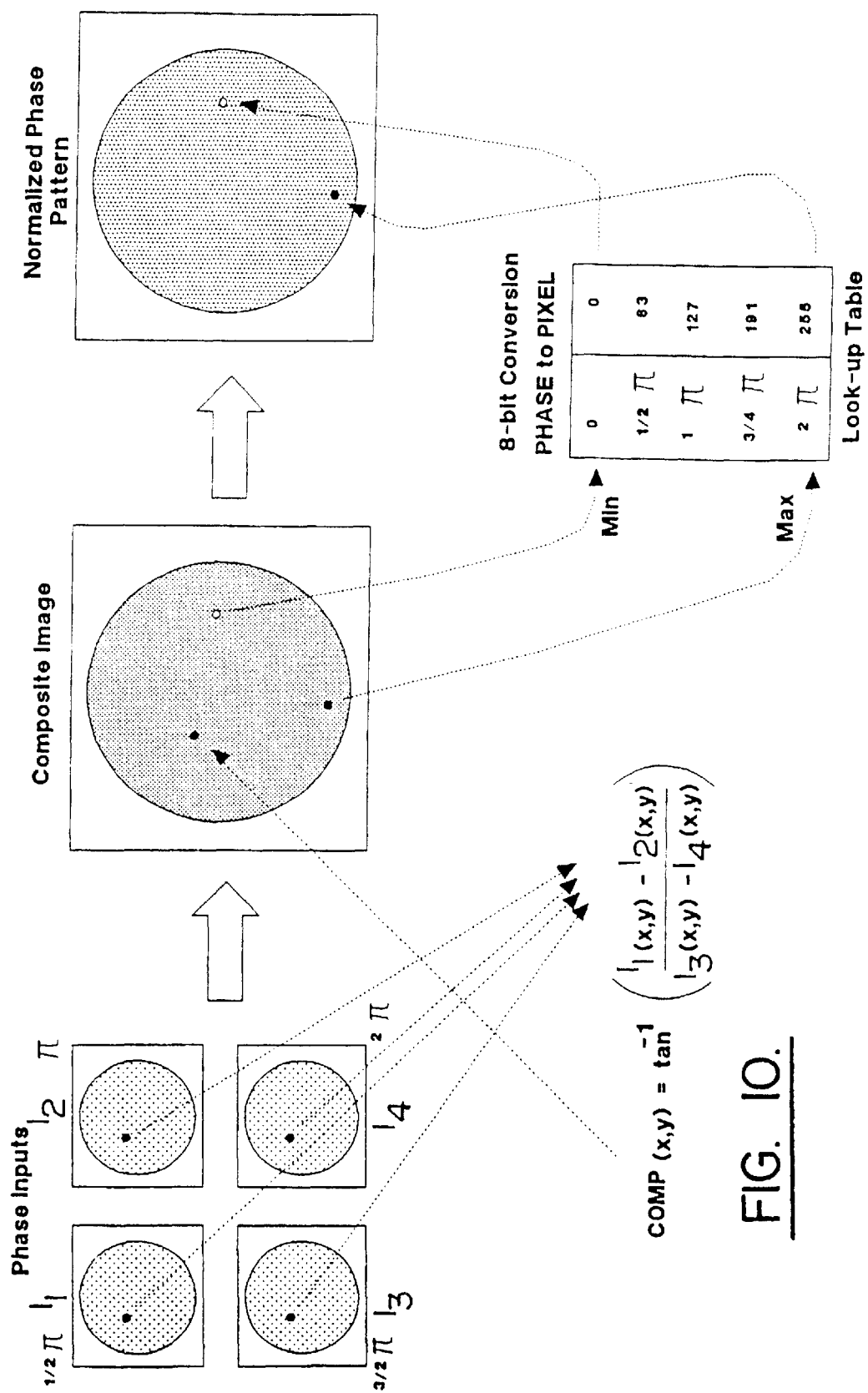
FIG. 10 is a representation of the phase shrift analysis and the process of generating first a composite phase image from the four phase shift images and then a normalized phase pattern from the maximum and minimum values of the composite phase image according to one embodiment of the automated optical fiber inspection apparatus of the present invention.

In addition to displaying the interferrograms upon a video display 114, the imaging system 108, such as the Physic Instrument from Nordland Products, Inc. or other phase shift analysis software, generates a composite image which is then grey scale normalized to a single phase pattern as shown schematically in FIGS. 9E and 10. See blocks 403–404 of FIG. 6E.

In order to determine a composite image COMP(x,y) based upon the four interferrograms, the value representing phase modulo π/2 for each pixel of the composite image can be calculated by one method as follows:

$$\Phi = \frac{|I_4(x, y) - I_2(x, y)|}{|I_1(x, y) - I_3(x, y)|}$$

Since the above function only generates an angular value in the first quadrant, each pixel of a composite image having an accurate angle with a value in the range of 0 to 2π radian, i.e., the phase module 2π, is determined by the following table (in which "Phase" represents the value of the respective pixel of the composite image) with the actual signs, i.e., prior to taking the absolute value, of the numerator and the denominator of taken into consideration as follows:

TABLE I

| Numerator | Denominator | Phase (radian) |
|---|---|---|
| + | + | Φ |
| + | − | π − Φ |
| + | o | π/2 |
| − | + | 2π − Φ |
| − | − | π + Φ |
| − | o | 3π/2 |
| o | − | π |
| o | + | o |

Figure 11A:
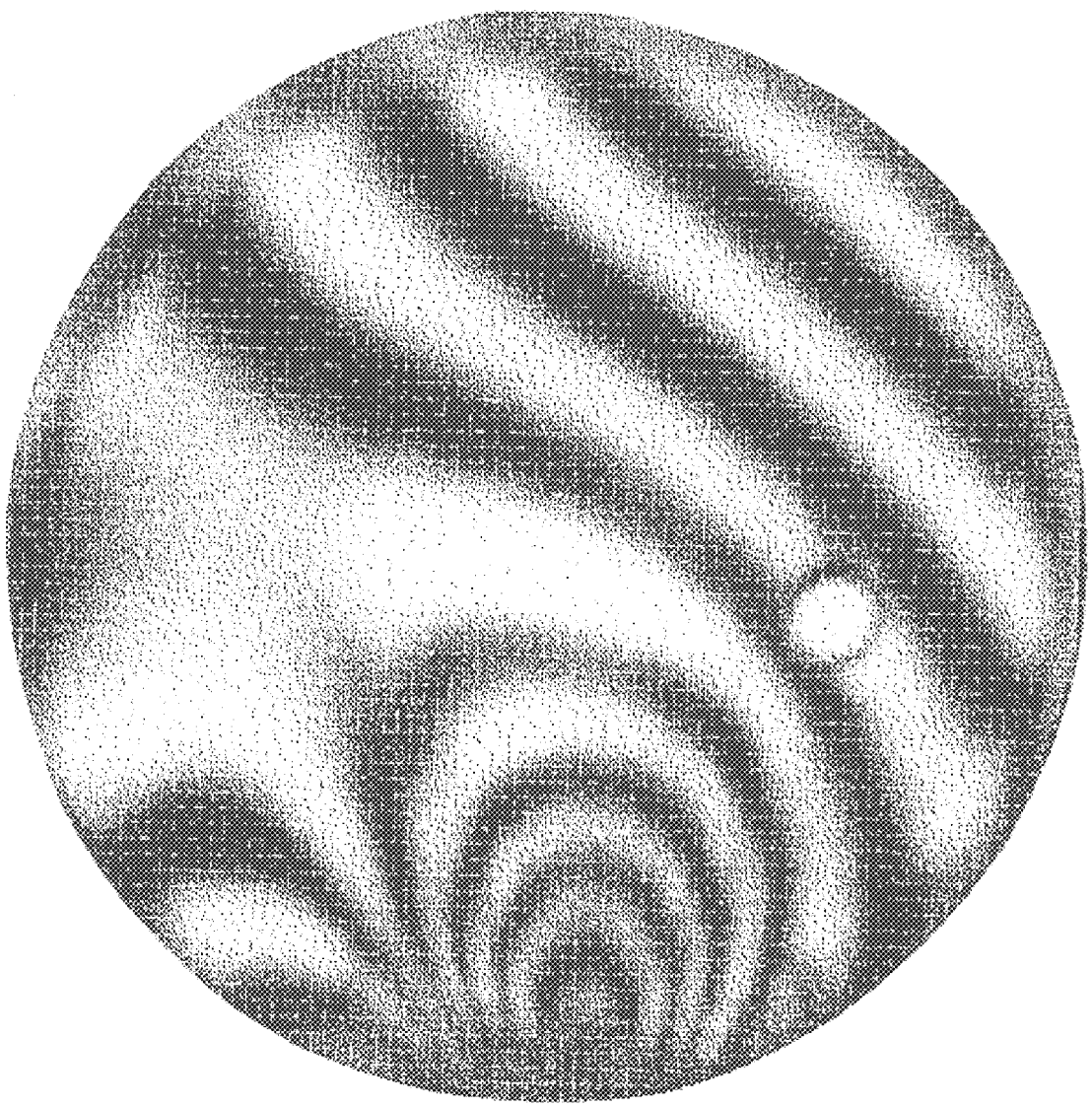
FIGS. 11A and 11B are digitized composite images before and after edge enhancement, respectively, which enhance the distinctive pattern of an image which otherwise may be obscured due to the blurring boundaries of the features.
Figure 11B:

FIG. 10 shows the above method applied to calculate the composite image at a pixel located at (x,y), i.e., COMP(x,y), based upon the intensity values of pixels from four interferrograms $I_1$, $I_2$, $I_3$, and $I_4$ at the same location (x,y). As also shown in FIG. 10, the composite image is typically normalized by converting the phase of each pixel of the composite image (0 to 2π) to a corresponding grey scale value (0 to 255, i.e., 0 to $2^8$, if there are 8 bits per pixel). In addition, the imaging system subjects the composite image to a rotation invariance transformation to convert the positional relationship information of the data set from polar to rectangular for lateral movement of the image rather than rotational movement, for pattern comparison processing of the composite image as known to those skilled in the art. See block 405 of FIG. 6E. As shown in FIG. 11, the composite image can also be edge enhanced prior to the normalization process. For example, the composite image shown in FIG. 11A can be edge enhanced to generate the image shown in FIG. 11B. As known to those skilled in the art, the subsequent analysis of the image, typically by means of fuzzy logic, is facilitated by edge enhancing the composite image.

Figure 12A:
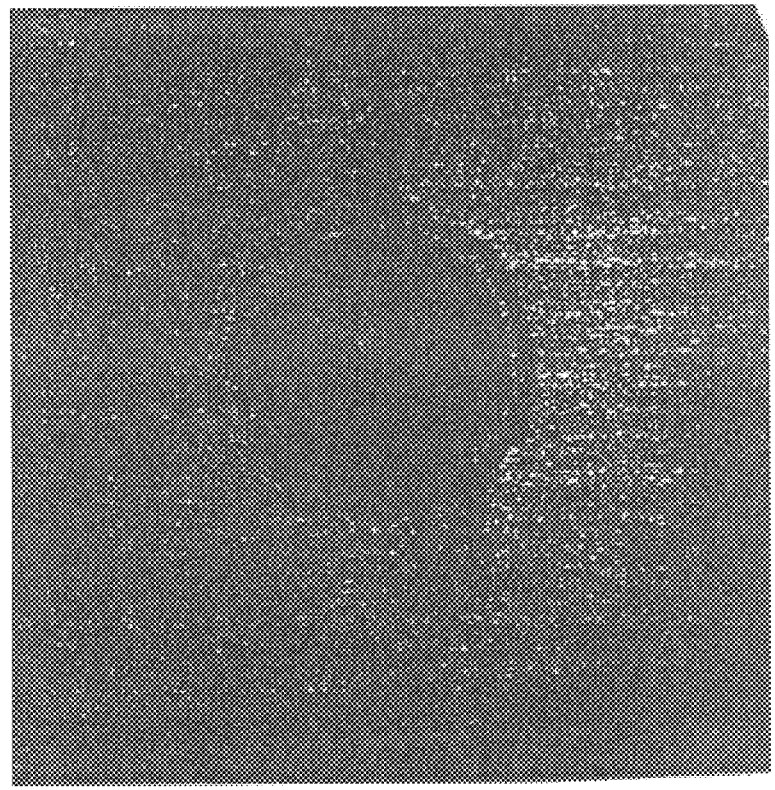
FIGS. 12A–12D are a composite image and related contour maps of an end face of an optical fiber having a minor defect that is correctable by further polishing.
Figure 12B:
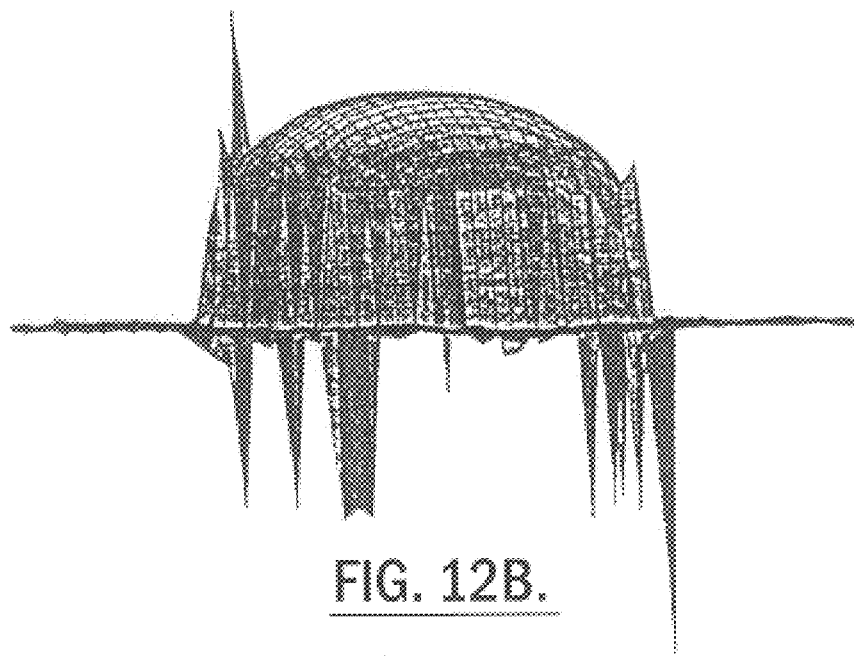
Figure 12C:
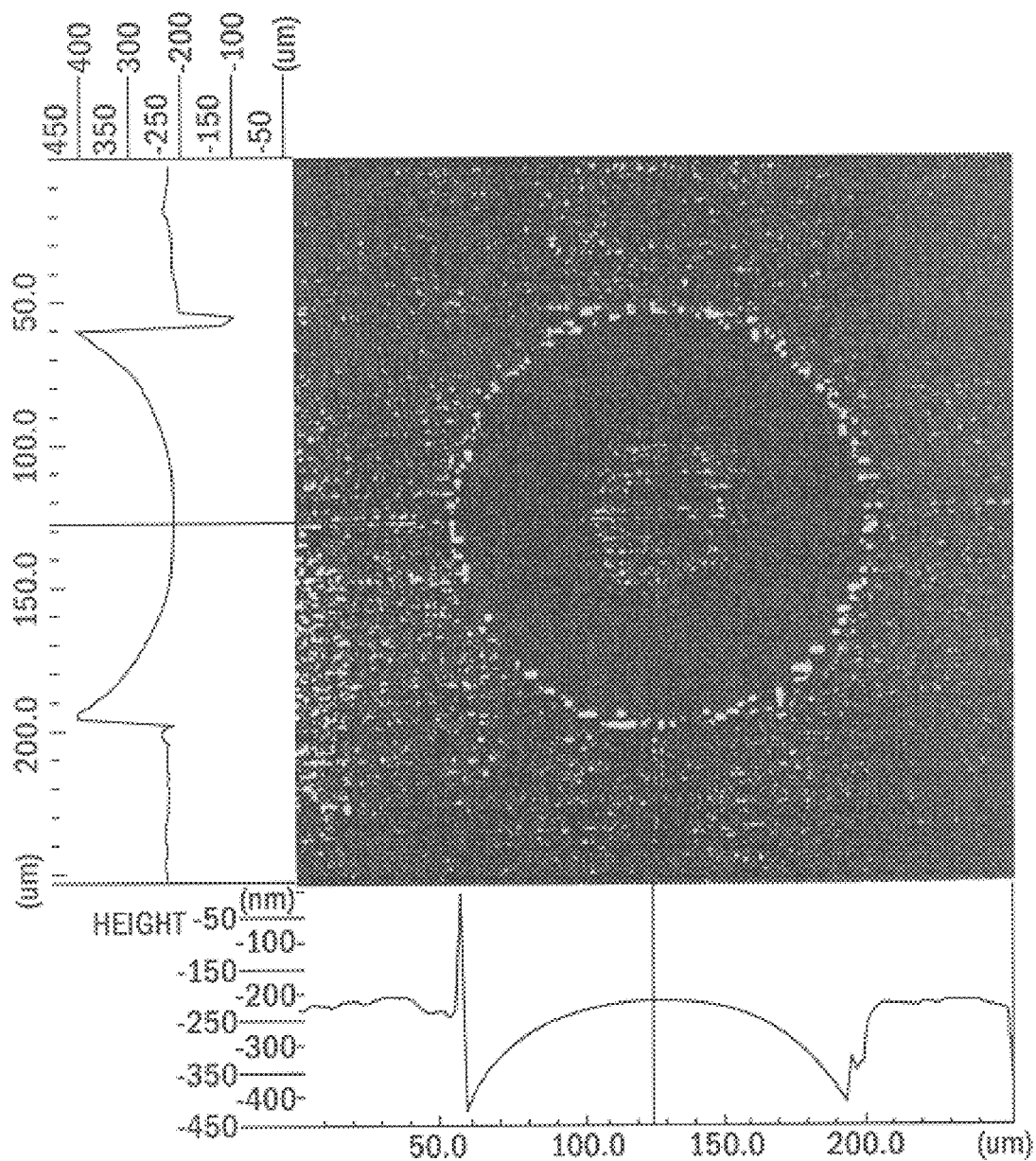
Figure 12D:
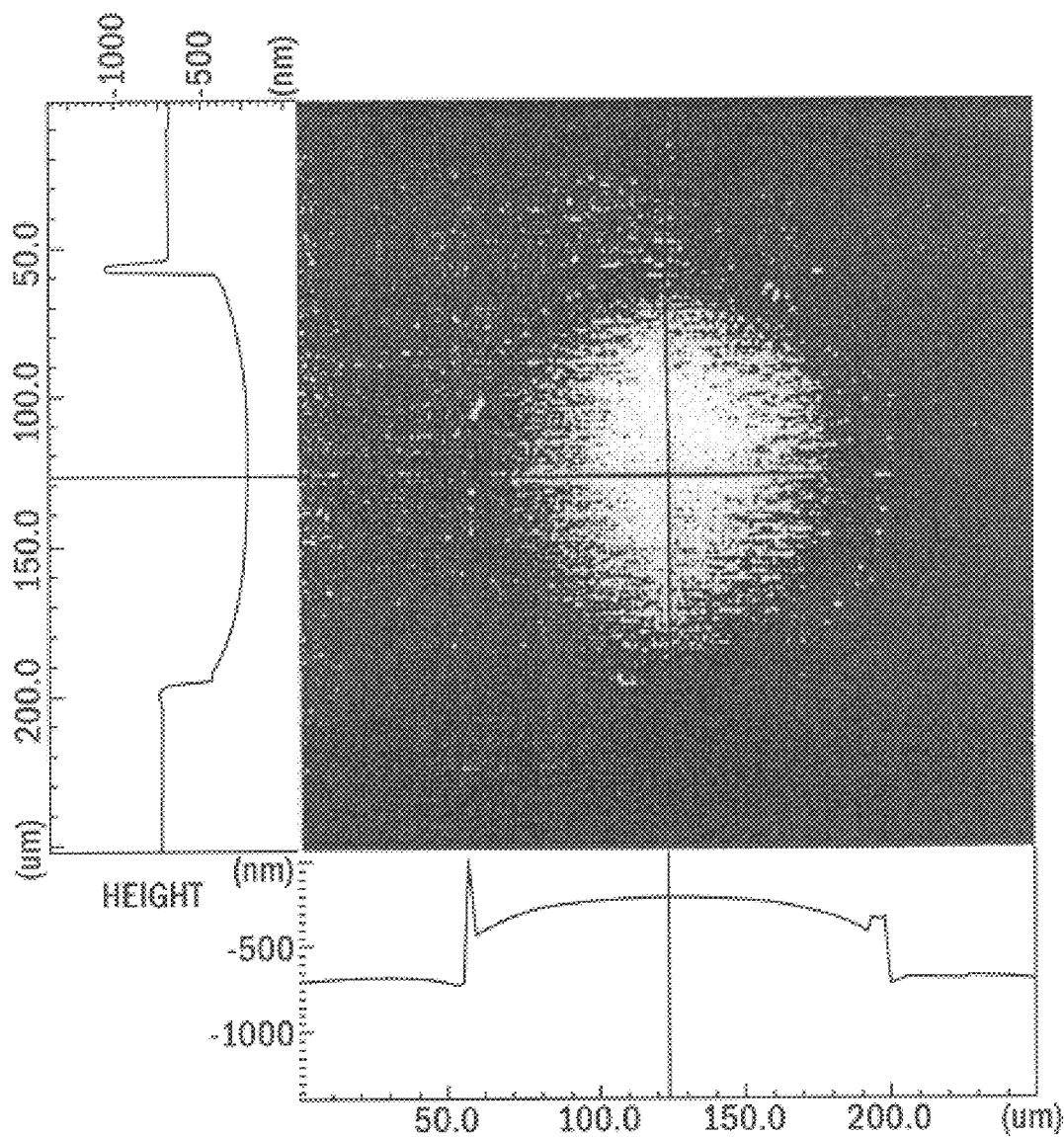
Figure 13A:
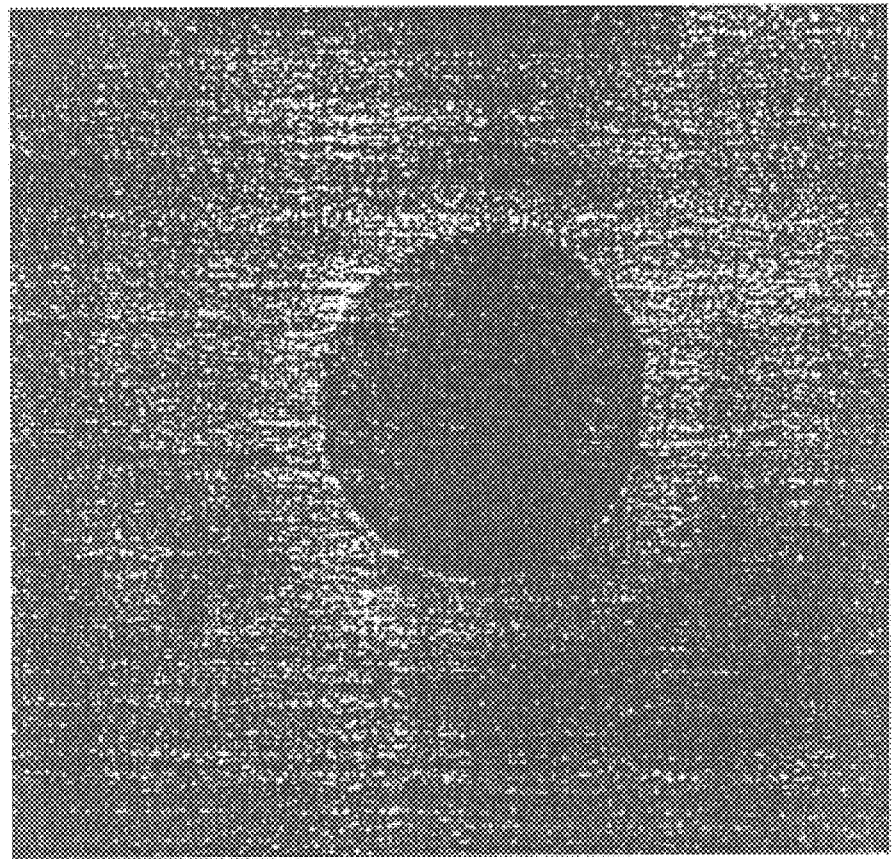
FIGS. 13A–13D are a compose image and related contour maps of an end face of an optical fiber having a serious defect that cannot be corrected by further polishing.
Figure 13B:
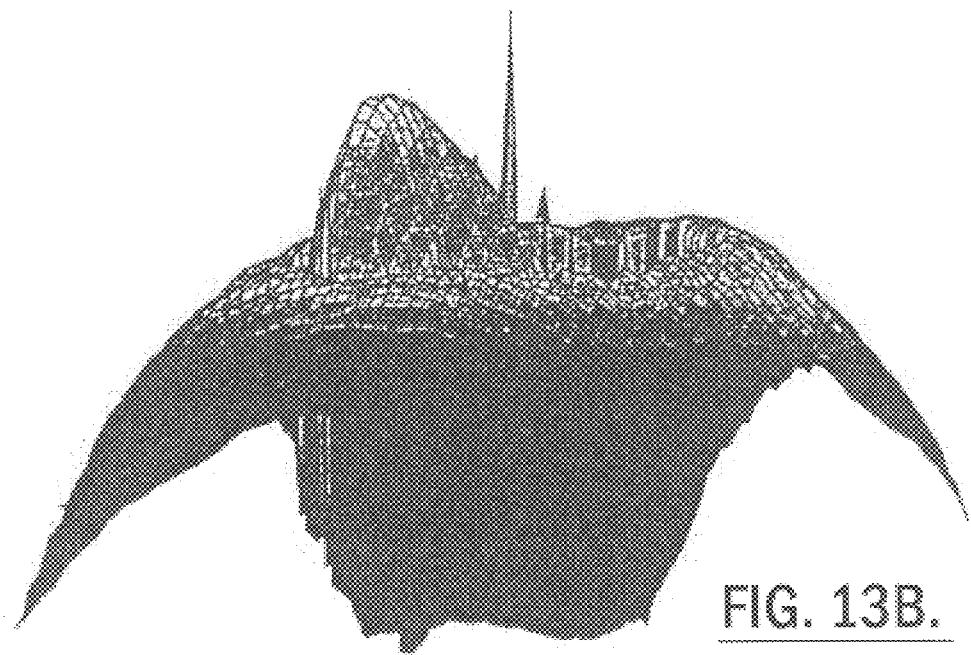
Figure 13C:
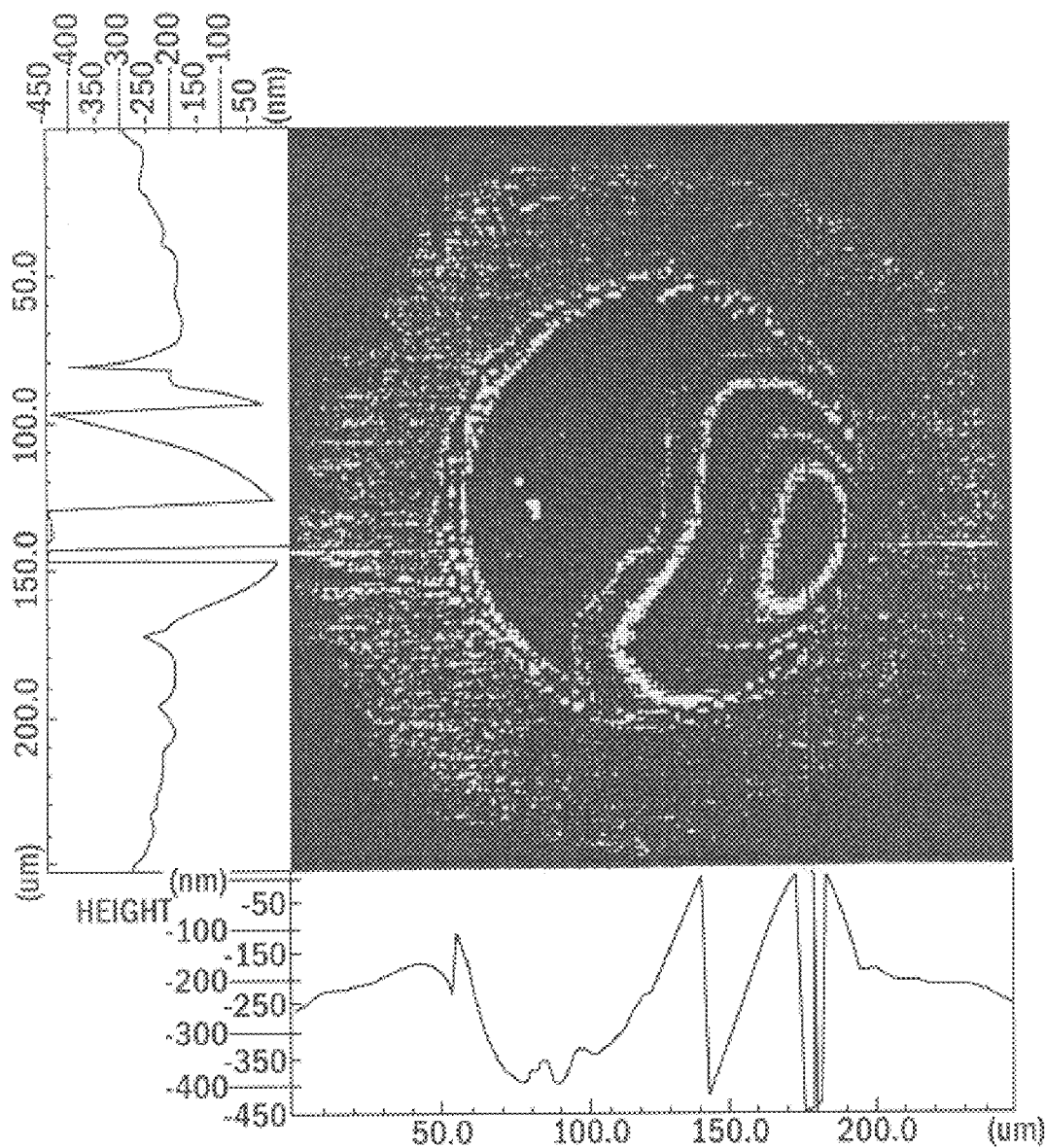
Figure 13D:
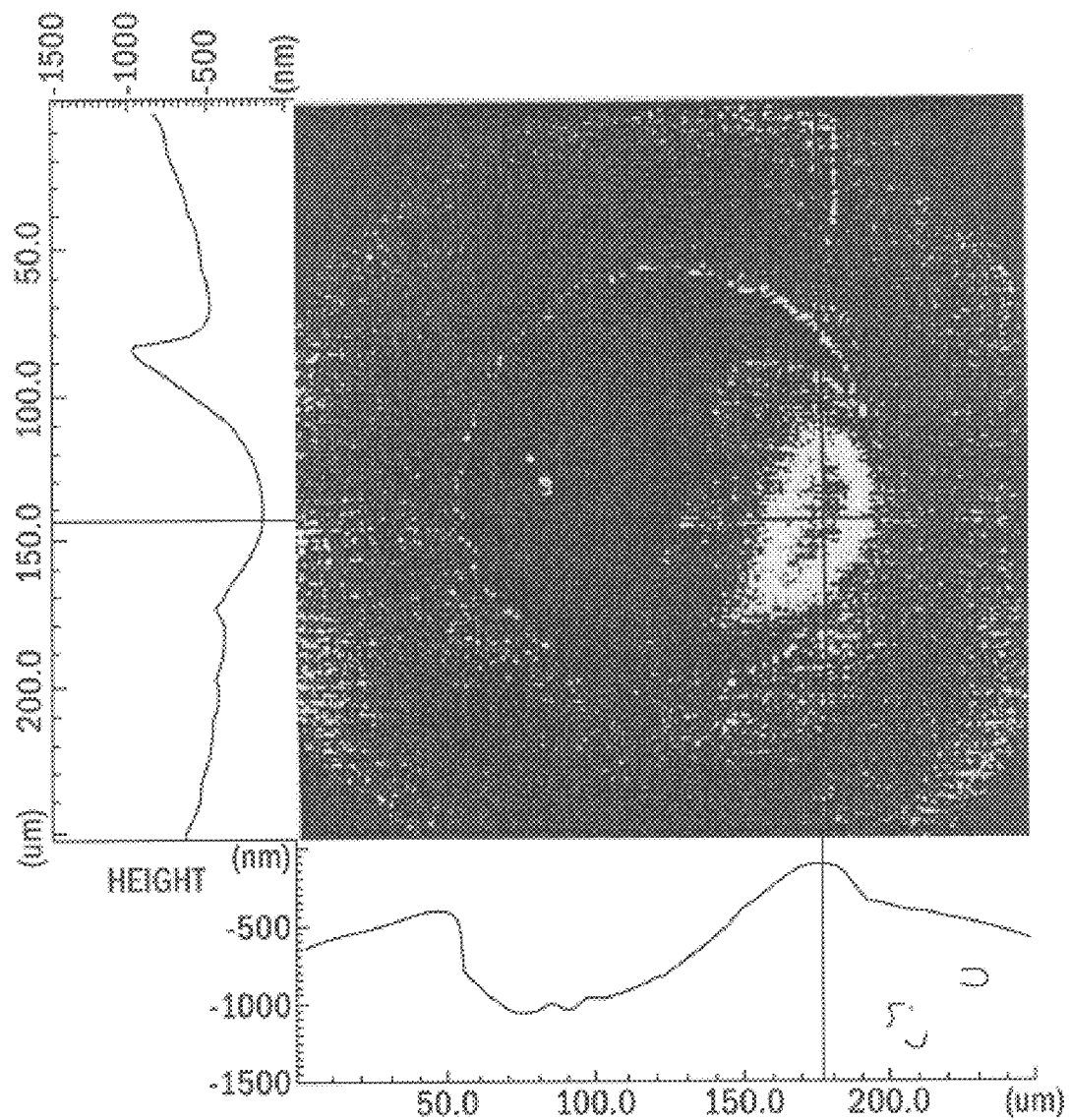

For purposes of illustration, FIGS. 12A and 13A depict composite images of the end faces of two different optical fibers. As FIGS. 12 and 13 indicate, the composite images provide, among other things, Information relating to polishing depth and fiber face contour. For example, FIGS. 12B–12D illustrate various contour maps derived from the composite image of FIG. 12A. In particular, FIG. 12B is a three dimensional mesh view of the composite image, FIG. 12C is a display of the spherical fitting error and FIG. 12D is a surface contour display. As shown, the end face of the optical fiber illustrated in FIGS. 12A–12D is unacceptable due to the peak on one side of the end face that should be correctable by polishing. Likewise, FIGS. 13B–13D illustrate the various contour maps of the composite image of FIG. 13A. In contrast to the correctable end face of FIGS. 12A–12D, the end face of FIGS. 13A–13D is not only unacceptable, but is also uncorrectable since one side of the end face is deeply pitted, if not fractured.

Figure 15:
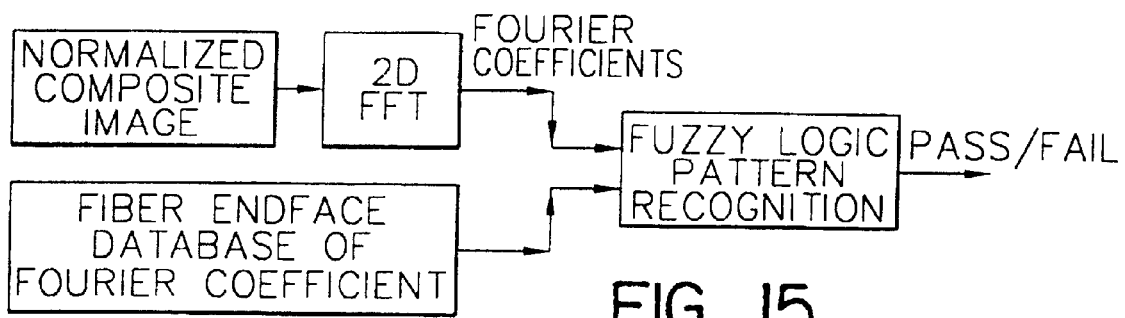
FIG. 15 is a block diagram of the operations performed by one advantageous embodiment of the automatic optical fiber inspection apparatus of the present invention.

The end face inspection unit 106 also includes means for comparing the image, i.e., the composite image or, more preferably, the normalized image, of the end face of the optical fiber with predefined data relating tabto at least one characteristic of the end face of the optical fiber to automatically determine if the optical fiber is acceptable. This comparison can be performed in several different manners without departing from the spirit and scope of the present invention. As shown in FIGS. 14 and 15, for example, the composite image can be compared to several reference images that have been previously classified as either acceptable or unacceptable. By determining which of the reference images is most similar to the composite image, i.e., the best match, the end face inspection unit and, more particularly, the comparing means also classifies the composite image as acceptable or unacceptable. See blocks 407–409 of FIG. 6E. By directly inspecting the end face geometry by means of pattern comparison, instead of feature extraction, and by determining the best match instead of an exact match, the comparing means of the present invention greatly simplifies and accelerates the overall inspection process.

The reference images are typically downloaded to a memory device associated with the end face inspection unit 106. For example, the reference images can be downloaded from an external database 26, such as the fiber optic and connector database. Alternatively, the end face finishing inspection unit can include a video camera 116 and a video recorder 118 for recording the reference images of acceptable and unacceptable end faces for subsequent downloading to a memory device for comparison with the composite image, as shown in FIG. 14. As a result, the inspection criteria can be changed by merely changing the reference images without any alterations to the software which could be quite complex. In addition, the automatic finer optic inspection system can include artificial intelligence which supplements the reference images to include actual images of the end faces of some or all of the optic fibers that have undergone inspection and been classified as either acceptable or unacceptable.

The end face inspection unit 106 can also include a fuzzy logic work station 120 for comparing the composite image with the various reference images to determine if the surface configuration of the end face of the optical fiber is acceptable. Typically, the composite image is not compared directly to the reference images. Instead, as shown in FIG. 15, the comparing means generally compares a two dimensional fast fourier transform of the composite image to the two dimensional fast fourier transforms of the reference images. Typically, the two dimensional fast fourier transforms of the reference images are also stored in the memory device of the imaging system 108. In one embodiment, the fuzzy logic work station includes a NeuralLogix ASD110 Fuzzy Pattern Comparator which compares the various reference images to the composite image to determine the best match. As shown in FIG. 14, both the imaging system and the fuzzy logic work station can have a monitor 122 and a keyboard 124. In addition, the fuzzy logic work station can have a printer 126. Although illustrated to be separate from the central computer 22, the fuzzy logic work station can be incorporated within the computer, if so desired.

Figure 18:
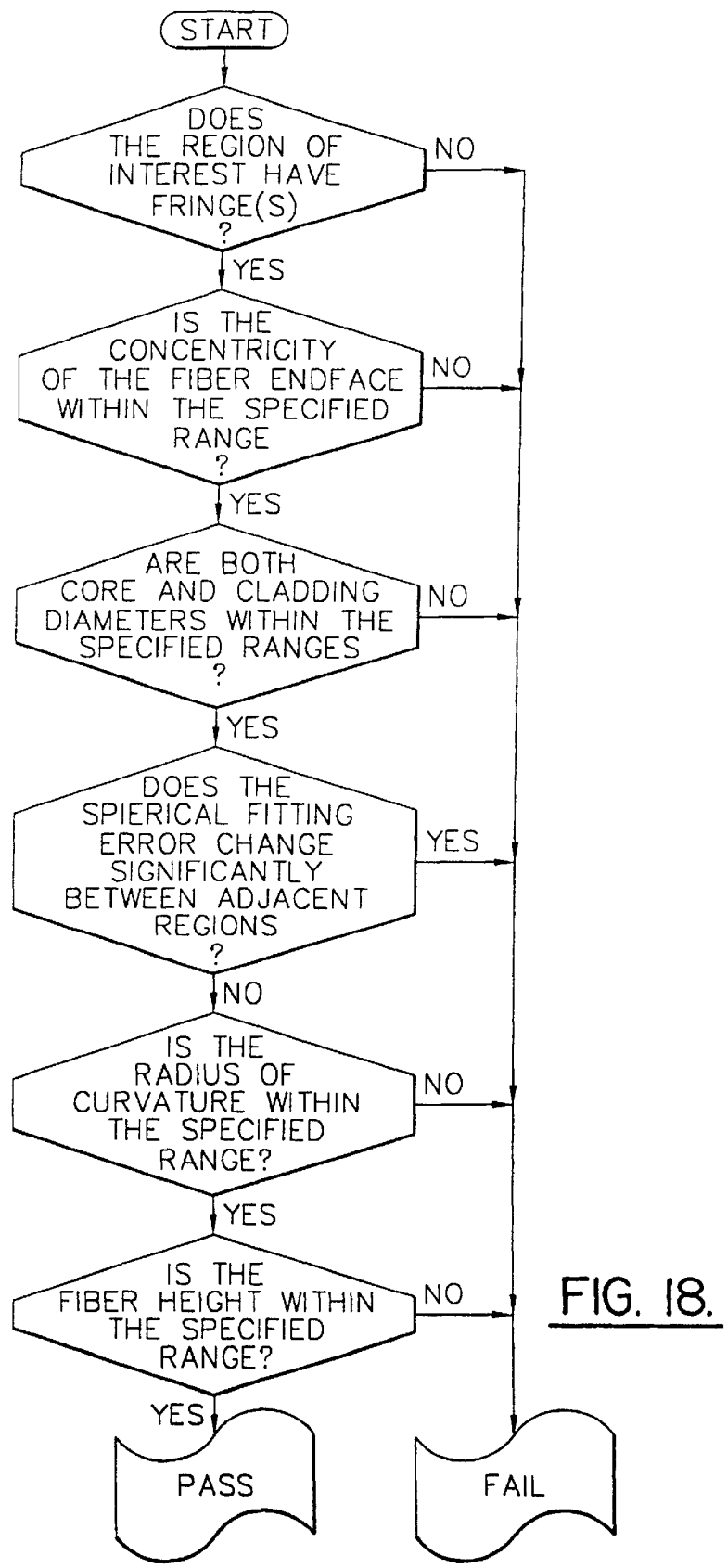
FIG. 18 is a block diagram of the operations performed to determine if an end face of an optical fiber is acceptable according to one embodiment of the present invention.

During the construction of the composite image, the imaging system, such as the Physic Instrument (PI) by Nordland Products, Inc., also preferably extracts a number of features relating to the fiber end-face geometry. See block 406 of FIG. 6E. Although the extracted features are not typically utilized during the process of determining if the fiber end-face is acceptable as shown in FIG. 18, the extracted features are preferably stored along with other data relating to the particular optical fiber for subsequent review and/or analysis. In one advantageous embodiment, the features extracted from the composite image include: (1) radius of curvature of the end face, (2) spherical-fitting error, (3) fiber height (protruding or recessed), (4) fiber core diameter, (5) fiber cladding diameter, (6) concentricity of the end face, and (7) fringes within the Region of Interest (ROI) including, at least, the fiber end-face.

As shown in Table I, the normalized composite image of the interferrogram is typically stored in the memory of the imaging system 108 along with an identification number, a two dimensional surface profile, the fourier coefficients of the two dimensional surface profile, the various features extracted from the composite image and an indication as to whether the end face of the optical fiber is acceptable or unacceptable, i.e., pass or fail. As such, the automated fiber optic connectorization apparatus maintains detailed records relating to the connectorization and inspection of each fiber optic cable.

TABLE II

| Field | Field Name | Data Type |
|---|---|---|
| 1 | Record I.D. | Text/Numeric |
| 2 | Interferrogram (Image) | OLE Object |
| 3 | 2D surface profile | Binary/Bitmap |
| 4 | Fourier Coefficients (2D Image) | Numeric |
| 5 | Radius of Curvature of the End Face | Numeric |
| 6 | Spherical fitting Error | Numeric |
| 7 | Fiber Height | Numeric |
| 8 | Fiber, Core Diameter | Numeric |
| 9 | Fiber Cladding Diameter | Numeric |
| 10 | Surface Slope | Numeric |
| 11 | Diameter of Region of Interest | Numeric |
| 12 | Pass/Fail Classification | Yes/No |

In addition to merely determining whether the end face of an optical fiber is acceptable or unacceptable, the end face inspection unit 106 also preferably determines if an unacceptable end face can be corrected, such as by further polishing the end face, or if the optical fiber must be totally reworked or discarded. See block 410 of FIG. 6E. For purposes of illustration, FIGS. 16 and 17 depict the end faces or a number of optical fibers that include defects that are correctable and uncorrectable, respectively. It should be apparent that data, i.e., reference images, representative of the various end faces of the optical fibers of FIGS. 16 and 17 would be compared to the composite image of an unacceptable end face to determine if the defect is correctable.

In particular, FIGS. 16A–16C shows several end faces having defects which fail inspection, but can be repaired by repolishing. These defects include an upwardly protruding lip, scratches and hackle. Each of these defects can be corrected by the removal of material from the end face, such as with further polishing. In contrast, FIG. 17 shows several end faces having defects which cannot be corrected. These defects include a score/indent, a rolloff on one side, a chip out of the side, cracks, a shattered end face and an angled end face. These defects are not correctable and would require recleaving and complete reprocessing.

The automatic fiber optic connectorization apparatus 20 also includes means for obtaining the components that will be mounted upon the end portion of the fiber optic cable once the end face of the optical fiber is found to be acceptable. In particular, the automatic fiber optic connectorization apparatus obtains both the connector parts and the supplies, such as the epoxy, required to mount the specified type of connector upon the end portion of the fiber optic cable. As described above, the system operator generally provides an indication of the type of connector to be mounted upon the fiber optic cable and the fiber optic cable and connector database 26 defines the various parts and supplies required to assemble and mount the specified type of connector. According to one embodiment, the automatic fiber optic connectorization apparatus includes a plurality of mechanical grippers or other types of robotic arms that operate under control of the controller 30 for automatically obtaining the various parts and supplies that have been previously cleaned and sorted into different predetermined bins as shown. Typically, the parts are cleaned by ultrasonic and spray methods and are then inspected to insure that the parts are sufficiently clean. Thereafter, the mechanical grippers obtain the necessary parts from different predetermined bins into which the parts have been sorted or from sequential feed reels as known to those skilled in the art.

The automatic fiber optic connectorization apparatus 20 also includes means, typically including a connector bonding unit 128, for assembling the components upon the end portion of the fiber optic cable once the necessary parts and supplies have been obtained. In particular, the connector bonding unit generally bonds the ferrule to the end portion of the optical fiber with an epoxy. See block 500 of FIG. 6A. As known to those skilled in the art, the epoxy can be two-part resin and catalyst or a B-stage epoxy depending upon the type of connector to be mounted upon the fiber optic cable. As described above, the type of epoxy and the placement of the epoxy relative to he optical fiber and ferrule is typically defined by the fiber optic cable and connector database 26.

If a two-part epoxy is utilized to bond the ferrule to the optical fiber, the connector bonding unit 128 initially inserts the epoxy into the ferrule and the ferrule is then positioned on the optical fiber such that the end portion of the optical fiber extends through the bore of the ferrule. See blocks 501–502 of FIG. 6F. Preferably, the optical fiber extends through the bore of the ferrule such that the end face of the optical fiber is aligned with the end of the ferrule as required to meet the input performance requirements and connector assembly parameters provided by the system operator, the wire data list or other source. If the optical fiber is to extend beyond the end of the ferrule, the ferrule is then retracted such that the end portion of the optical fiber extends beyond the end of the ferrule by the desired amount. If a B-stage epoxy is instead utilized to bond the ferrule to the end portion of the optical fiber, the connector bonding unit fully inserts the optical fiber into the ferrule such that the optical fiber need not later be repositioned.

Figure 6F:
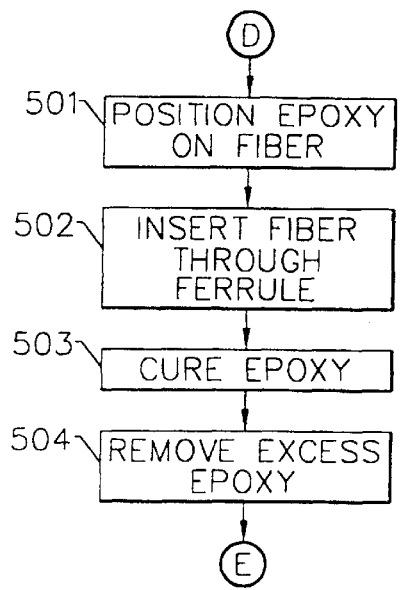
FIG. 6F is a block diagram of the operations performed to mount a connector upon the end portion of a fiber optic cable according to one embodiment of the present invention.

As shown in blocks 503–504 of FIG. 6F, the epoxy is then cured, excess epoxy is removed from the end face of the optical fiber, and she cable assembly is inspected. Since most epoxy must be heat cured, the connector bonding unit typically includes a heater 130 for curing the epoxy. To cure epoxy having a relatively small cure time, such as a B-stage epoxy, the end portion of the optical fiber is held in place and the heaters positioned near the end portion of the optical fiber for the required cure time. Alternatively, for epoxy having a relative long cure time, such as two-part liquid epoxy resins, the connector bonding unit may include a separate curing station to simultaneously heat a number of fiber/ferrule combinations. The connector bonding unit preferably controls the temperature of the heater and the cure time in accordance with the data provided by the fiber optic cable and connector database 26. For example, B stage preformed epoxy is generally cured at 150° C. for 1 hour. Alternatively, two part epoxy is typically cured by ramping the heat up to 80° C. for 1 hour, followed by a heat soak at 120° C. for one hour, and a post-cure heat soak at 150° C. for one hour. As known to those skilled in the art, however, some epoxies require different cure schedules depending on the cable/connector utilization.

Once the epoxy has been cured, the connector bonding unit 128 removes excess epoxy from the end face of the optical fiber, the end of the ferrule and other undesirable locations. As described above, the connector bonding unit can utilize a cassette 82 as shown in FIGS. 8A and 8B that includes a cleaning strip for cleaning the connectorized optical fiber. In one advantageous embodiment, the cleaning strip is impregnated with a clearing solution for application to the end face of the optical fiber. After the cleaning solution has been applied, wiped and dried, the end face of the optical fiber can be inspected once again, such as by means of the imaging system 108 described above or the optical performance inspection unit 132 described below and shown an block 600 of FIG. 6A.

If the end face of the optical fiber is to be concave, the automatic fiber optic connectorization apparatus 20 preferably further polishes the end face of the optical fiber after the ferrule has been mounted thereon, but prior to cleanings the end face of the optical fiber. Since the ferrule is harder than the optical fiber, the abrasive carried by the polishing strip will preferentially remove material from the end face of the optical fiber, thereby forming a concave surface.

Figure 6G:
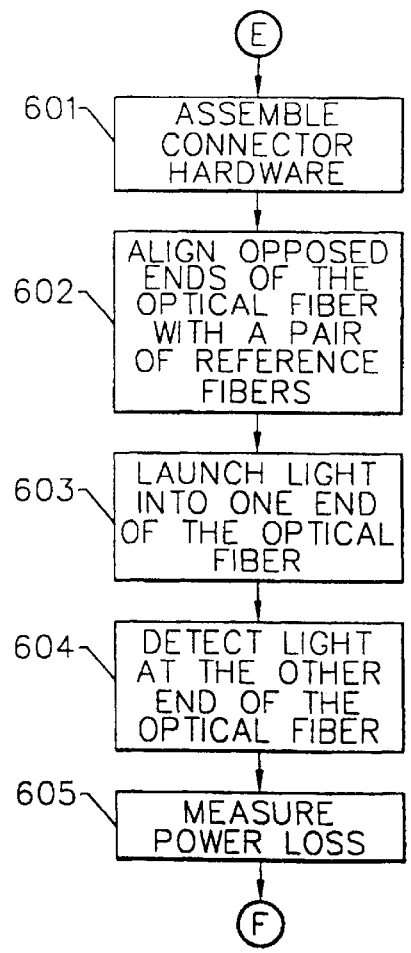
FIG. 6G is a block diagram of the operations performed to inspect a connectorized fiber optic cable according to one embodiment of the present invention.

The automatic fiber optic connectorization apparatus 20 and, more particularly, the controller 30 also obtains and mounts any additional connector parts or hardware that are required pursuant to the fiber optic cable and connector database 26. See block 601 of FIG. 6G. For a 16 gauge connector, for example, the automatic fiber optic connectorization apparatus would also mount a spring, an outer sleeve and a guide sleeve. For an NTT FC connector, the automatic fiber optic connectorization apparatus would also mount a barrel, a strain relief boot, a coupling nut and a strength member retainer.

Once the additional connector parts have been assembled, the end face of the optical fiber and the connector mounted thereto are preferably cleaned and a performance inspection is conducted. In order to conduct the performance inspection, the automatic fiber optic connectorization apparatus 20 and, more particularly, the optical performance inspection unit 132 aligns the opposed ends of the fiber optic cable 148 with respective ends of a pair of reference optical fibers extending from a test station 150 and performs an optical loss measurement, typically under control of the central computer 22 and/or the controller 30. See block 602 of FIG. 6G. As shown in FIG. 19, the test station typically includes an optical source 152 for providing predetermined optical input to an input optical fiber. In addition to launching the predetermined optical input into a first end of the connectorized fiber optic cable under test as set forth by block 603, the test station also preferably includes a coupler or optical splitter 154 for coupling the input optical fiber to a medial portion of a second optical fiber having an anti-reflection block 156, such as an index matching gel, at one end, and a first detector or power meter 158 at the other end. Thus, the configuration of the test station shown in FIG. 19 forms a fiber optic interferometer to permit back reflections from the fiber optic cable under test to be measured by the first detector or power meter. The test station also preferably includes a second detector or power meter 160 optically connected to the second end of the connectorized fiber optic cable under test. See block 604. Based upon the readings of the first and second detectors, the optical performance inspection unit can determine the back reflection and optical loss of the fiber optic cable/connector assembly as shown in block 605. For most optical fibers, the optical loss should be less than 1 dB. The optical performance of the optical fiber, including the back reflections and optical loss, is preferably stored in memory for later display and hard copy print, thereby further improving the recordkeeping associated with the connectorization and inspection process.

Preferably, the optical performance inspection unit includes one or more micropositioners for automatically aligning the opposed ends of the connectorized fiber optic cable to respective ends of the optical fibers of the test station with the same tolerances as required during the mating of a pair of connectors. In this regard, the launch conditions will preferably be 100/100, i.e., 100% of the numerical aperture of the optical fiber under test and 100% of the core diameter of the optical fiber under test. In order to insure that the test station is properly calibrated, the test station preferably periodically measures the optical loss across a reference cable with a known loss.

Although not heretofore described, the product conformity inspection unit 138 preferably checks the components, i.e., the fiber optic cable and the connector components, prior to the connectorization process to insure that the components meet predefined standards or are within acceptable tolerances. See, for example, blocks 251–255 of FIG. 6C. Typically, the predefined tolerances and acceptable tolerances are provided by the fiber optic cable and connector database 26 for a variety of features, such as fiber concentricity, the outer diameter of the fiber cladding, the diameter of the fiber core, the inside and outside diameter of the connector ferrule and the ferrule concentricity. The product conformity inspection unit generally includes a vision system, including a camera and associated frame grabber software, for obtaining an image of the various components for subsequent analysis by the central computer 22 and associated software. In addition to reporting those components which fail to meet specifications as shown in block 255, the measured features of the various components are also preferably stored, thereby generating a statistical database. By determining the physical parameters of the various components of the connectorized fiber optic cables which ultimately have the best optical performance, the automated fiber optic connectorization and inspection apparatus 20 can also learn to select those components which have the physical parameters which are generally associated with fiber optic cables that perform acceptably.

By providing for the automatic connectorization of optical fibers, the automatic fiber optic connectorization method and apparatus 20 of the present invention significantly reduces the time and labor required to mount connectors upon the end portions of fiber optic cables, thereby Increasing production capacity. As a result, the automated fiber optic connectorization apparatus can be readily operated by technicians with very little training. The efficiency and yield of the automatic connectorization process or the present invention is further advanced by the automated optical fiber inspection apparatus of one embodiment that insures that the optical fibers nave been properly polished prior to mounting of the connectors and, if an optical fiber is unacceptable, automatically determines if the optical fiber must be repolished or otherwise reworked. In contrast to conventional automated connectorization techniques, the automated fiber optic connectorization apparatus of the present invention can advantageously mount any one of a plurality of types of connectors upon the end portion of a fiber optic cable based upon input by the system operator or other source, thereby permitting rapid customization of the automated fiber optic connectorization apparatus.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included with the scope of the appended claims. Although specific terms are employed herein, they are used in a generic and descriptive sense only and not for purposes of limitation.

That which is claimed is:

1. An automated optical fiber inspection apparatus for inspecting an end face of an optical fiber, the automated optical fiber inspection apparatus comprising:

a memory device for storing images of acceptable end faces and unacceptable end faces;

an imaging system for obtaining an image of the end face of the optical fiber; and means, responsive to said imaging system, for comparing the image of the end face of the optical fiber with the images of acceptable end faces and unacceptable end faces to automatically determine if the optical fiber is acceptable.

2. A automated optical fiber inspection apparatus according to claim 1 further comprising a test station for determining the optical performance of optical fiber.

3. An automated optical fiber inspection apparatus comprising:

a memory device for storing images of acceptable end faces and unacceptable end faces;

an imaging system for obtaining an image of the end face of the optical fiber; and means, responsive to said imaging system, for comparing the image of the end face of the optical fiber with the images of acceptable end faces and unacceptable end faces to automatically determine if the optical fiber is acceptable; and means, responsive to said comparing means, for automatically determining if the end face of an unacceptable optical fiber can be corrected.

4. A method for automatically inspecting an end face of an optical fiber, the method comprising the steps of:

providing a memory device for storing images of acceptable end faces and unacceptable end faces;

obtaining an image of the end face of the optical fiber; and comparing the image of the end face of the optical fiber with the images of acceptable end faces and unacceptable end faces to automatically determine if the optical fiber is acceptable.

5. A method according to claim 4 further comprising the step of testing the optical fiber to determine the optical performance of the optical fiber.

6. A method for automatically inspecting an end face of an optical fiber, the method comprising the steps of:

providing a memory device for storing images of acceptable end faces and unacceptable end faces;

obtaining an image of the end face of the optical fiber;

comparing the image of the end face of the optical fiber with the images of acceptable end faces and unacceptable end faces to automatically determine if the optical fiber is acceptable; and automatically determining if the end face of an unacceptable optical fiber can be corrected.

* * * * *